United States Patent
Anastasakos et al.

(10) Patent No.: US 9,892,208 B2
(45) Date of Patent: Feb. 13, 2018

(54) ENTITY AND ATTRIBUTE RESOLUTION IN CONVERSATIONAL APPLICATIONS

(71) Applicant: MICROSOFT TECHNOLOGY LICENSING, LLC, Redmond, WA (US)

(72) Inventors: Tasos Anastasakos, San Jose, CA (US); Alexandre Rochette, Montreal (CA); Ruhi Sarikaya, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 347 days.

(21) Appl. No.: 14/243,826

(22) Filed: Apr. 2, 2014

(65) Prior Publication Data
US 2015/0286747 A1 Oct. 8, 2015

(51) Int. Cl.
G06F 17/30 (2006.01)
G06F 17/27 (2006.01)
G06F 17/28 (2006.01)

(52) U.S. Cl.
CPC ........ *G06F 17/30917* (2013.01); *G06F 17/27* (2013.01); *G06F 17/28* (2013.01);
(Continued)

(58) Field of Classification Search
USPC ................ 707/776; 455/456; 701/410–533
See application file for complete search history.

(56) References Cited

U.S. PATENT DOCUMENTS

| 7,475,010 B2 | 1/2009 | Chao |
| 2005/0149538 A1* | 7/2005 | Singh ................ G06F 17/30893 |

(Continued)

FOREIGN PATENT DOCUMENTS

WO 2003088080 A1 10/2003

OTHER PUBLICATIONS

Khalid, et al., "The Impact of Named Entity Normalization on Information Retrieval for Question Answering", In Proceedings of Advances in Information Retrieval, 30th European Conference on IR Research, ECIR 2008, Mar. 30, 2008, 5 pages.
(Continued)

*Primary Examiner* — Hosain Alam
*Assistant Examiner* — Tuan-Khanh Phan
(74) *Attorney, Agent, or Firm* — Merchant & Gould P.C.

(57) ABSTRACT

User input expressed as text may be analyzed for determining a type of response, such as an application response, and/or determining a type of task that is requested by the user input. Entity representations may be identified, classified and/or or tagged based on a type of response, type of task and/or a set of entity types. A surface form of an entity, ambiguous entity representation and/or other type of expression within the user input may be resolved, normalized and/or mapped to a normalized value. Normalizing entities and/or entity attributes may involve using a set of normalization rules, a lookup table, one or more machined learned methods, and/or an entity normalization index that associates entities with alternate surface forms derived from web corpora. The normalized value may be used to construct a request to a structured knowledge source and/or an application.

20 Claims, 9 Drawing Sheets

(52) U.S. Cl.
CPC .. *G06F 17/30539* (2013.01); *G06F 17/30864* (2013.01); *G06F 17/30952* (2013.01)

(56) References Cited

U.S. PATENT DOCUMENTS

| | | | |
|---|---|---|---|
| 2008/0208864 A1* | 8/2008 | Cucerzan | G06F 17/278 |
| 2010/0094826 A1 | 4/2010 | Rouhani-Kalleh | |
| 2011/0078160 A1 | 3/2011 | Gotz et al. | |
| 2011/0106807 A1 | 5/2011 | Srihari et al. | |
| 2011/0131244 A1 | 6/2011 | Padovitz et al. | |
| 2012/0185478 A1 | 7/2012 | Topham et al. | |
| 2013/0173604 A1 | 7/2013 | Li et al. | |
| 2013/0174058 A1 | 7/2013 | Kaul et al. | |
| 2013/0275441 A1 | 10/2013 | Agrawal et al. | |
| 2014/0207776 A1* | 7/2014 | Harris | G06F 17/30976 707/737 |
| 2015/0019227 A1* | 1/2015 | Anandarajah | G10L 15/22 704/257 |
| 2015/0142851 A1* | 5/2015 | Gupta | G06F 17/30967 707/779 |

OTHER PUBLICATIONS

Jijkoun, et al., "Named Entity Normalization in User Generated Content", In Proceedings of the Second Workshop on Analytics for Noisy Unstructured Text Data, Jul. 24, 2008, 8 pages.

Hakkani-Tur, et al. "Exploiting Query Click Logs for Utterance Domain Detection in Spoken Language Understanding", In Proceedings of the 2011 IEEE International Conference on Acoustics, Speech, and Signal Processing (ICASSP), May 22, 2011, 4 pages.

Hakkani-Tur, et al. "Bootstrapping Domain Detection Using Query Click Logs for New Domains", In Proceedings of the 2011 International Speech Communication Association (ISCA) Annual Conference (INTERSPEECH 2011), Aug. 27, 2011, 4 pages.

Hakkani-Tur, et al. "Employing Web Search Query Click Logs for Multi-Domain Spoken Language Understanding", In Proceedings of the 2011 IEEE Automatic Speech Recognition and Understanding Workshop (ASRU), Dec. 11, 2011, 6 pages.

Hakkani-Tur, et al. "Using a Knowledge Graph and Query Click Logs for Unsupervised Learning of Relation Detection", In Proceedings of the 2013 IEEE International Conference on Acoustics, Speech, and Signal Processing (ICASSP), May 26, 2013, 5 pages.

Tur, et al. "Latent Semantic Modeling for Slot Filling in Conversational Understanding", In Proceedings of the 2013 IEEE International Conference on Acoustics, Speech, and Signal Processing (ICASSP), May 26, 2013, 5 pages.

\* cited by examiner

ENTITY AND ATTRIBUTE RESOLUTION IN CONVERSATIONAL APPLICATIONS

BACKGROUND

In a typical web search, a computer user submits a search query to a search engine by inputting a string of text that describes a concept of interest using keywords. In response to the search query, the search engine parses the text, identifies relevant web pages, and presents the user with a search engine results page in the form of a listing of hyperlinks to relevant web pages and a short description of content that matches the keywords.

Algorithms such as page ranking have been employed in web search to determine the importance or relevance of a web page and present the most relevant hyperlinks in a search results page. The ranking of a particular web page may be based on metrics such as: number of hyperlinks to the web page, number of queries that result in the hyperlink to the web page, and popularity of the web page measured by the click-through rate of the hyperlink when selected from search results.

A search engine may employ techniques such as query expansion to address alternate word forms used to describe a concept of interest in a query. In general, query expansion reformulates a seed query using synonyms and variants to match additional web pages. While query expansion allows a user to submit a search query using alternate word forms to describe a concept of interest, query expansion typically provides search results that are less precise and that include hyperlinks to web pages beyond the concept of interest sought by the user. In addition, when a search query includes terms that refer to multiple concepts, the search results returned by a search engine may include a hyperlink that is related to the concept of interest sought by the user somewhere in the listing but will also include hyperlinks to unrelated content.

Approaches have been taken to resolve ambiguous references to entities that appear in the text of unstructured documents such as web pages. Named entity normalization, which is also termed named entity disambiguation, attempts to determine the unambiguous identity of a named entity that appears in text. The goal of named entity normalization is to link different surface forms of the named entity to a single corresponding referent that is identified by a canonical name in a knowledge base. As an example, attempts have been made to link mentions of named entities in web content to titles in the Wikipedia® Internet encyclopedia.

When desiring a scoped or specific result, a user may avoid an expansive web search and instead query a web service in a particular domain related to a concept of interest. For example, a user may query a particular web service that provides on-demand streaming movies when the user desires a result such as purchasing or viewing a specific movie.

Web services that focus on particular domains typically employ structured databases or catalogs that categorize and address a limited number of items which can be served to users. Such web services may allow users to browse items in a category, such as a selected movie genre, or submit a query for the name of an item, such as a particular movie title. When querying such a web service, however, a user may be limited to submitting query terms that comply with the categorization and addressing employed by the catalog structure in order to receive a desired result. In other words, web services that employ structured catalogs to index available items are not responsive to many of the numerous surface forms that can be used to describe an item. In the foregoing example, for instance, a query will not successfully retrieve a specific movie desired by the user if the query is not limited to words appearing in the title of the movie.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

User input expressed as text may be received and analyzed using various types of lexical, syntactic, semantic and/or contextual processing for determining a type of response, such as an application response, and/or determining a type of task that is requested by the user input. Entity representations, such as sub-phrases or other types of text, may be identified, classified and/or or tagged based on a type of task and/or a set of entity types. Entity types may be associated with a type of response, may be utilized by an application configured to provide a type of application response, and/or may correspond to a set of domain-dependent entity attributes. Entities may extend beyond named entities to entity attributes and other concepts. User input may be analyzed to detect a domain of the user input, detect an intent of the user input, and/or tag entity representations contained in the user input with slot types corresponding to the set of entity types.

A surface form of an entity, ambiguous entity representation or other type of expression, such as a temporal expression, a geographic expression, a numerical expression or a natural language expression, within the user input may be resolved, normalized and/or mapped to a normalized value such as: a canonical name, a canonical form, a canonical format, and/or another type of unique identifier.

Normalizing entities and/or entity attributes may involve using a set of normalization rules, using one or more lookup tables, using one or more machined learned methods, and/or using an entity normalization index that associates entities with alternate surface forms derived from web corpora.

An entity normalization index may be created by extracting a set of entities from an entity knowledge source, extracting related links that are relevant to the set of entities from a knowledge graph, data mining one or more web search logs using the related links to discover related queries, and building the entity normalization index by associating the related queries with the set of entities as alternate surface forms of the entities.

A normalized value may be used to construct a request to a structured knowledge source and/or an application, such as a tasked-based application or intelligent personal assistant. A constructed request may be configured for interacting with an application and/or structured knowledge source using canonical values supported by the application and/or structured knowledge source, querying a remote resource for information related to the user input, and/or causing an application to perform a particular task such as answering a question, playing a media item or scheduling an event.

These and other features and advantages will be apparent from a reading of the following detailed description and a review of the appended drawings. It is to be understood that the foregoing summary, the following detailed description

DETAILED DESCRIPTION

The detailed description provided below in connection with the appended drawings is intended as a description of examples and is not intended to represent the only forms in which the present examples may be constructed or utilized. The description sets forth functions of the examples and sequences of steps for constructing and operating the examples. However, the same or equivalent functions and sequences may be accomplished by different examples.

References to "one embodiment," "an embodiment," "an example embodiment," "one implementation," "an implementation," "one example," "an example" and the like, indicate that the described embodiment, implementation or example may include a particular feature, structure or characteristic, but every embodiment, implementation or example may not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic may be implemented in connection with other embodiments, implementations or examples whether or not explicitly described.

Numerous specific details are set forth in order to provide a thorough understanding of one or more aspects of the described subject matter. It is to be appreciated, however, that such aspects may be practiced without these specific details. While certain components are shown in block diagram form to describe one or more aspects, it is to be understood that functionality performed by a single component may be performed by multiple components. Similarly, a single component may be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Exemplary Operating Environment

Figure 1:
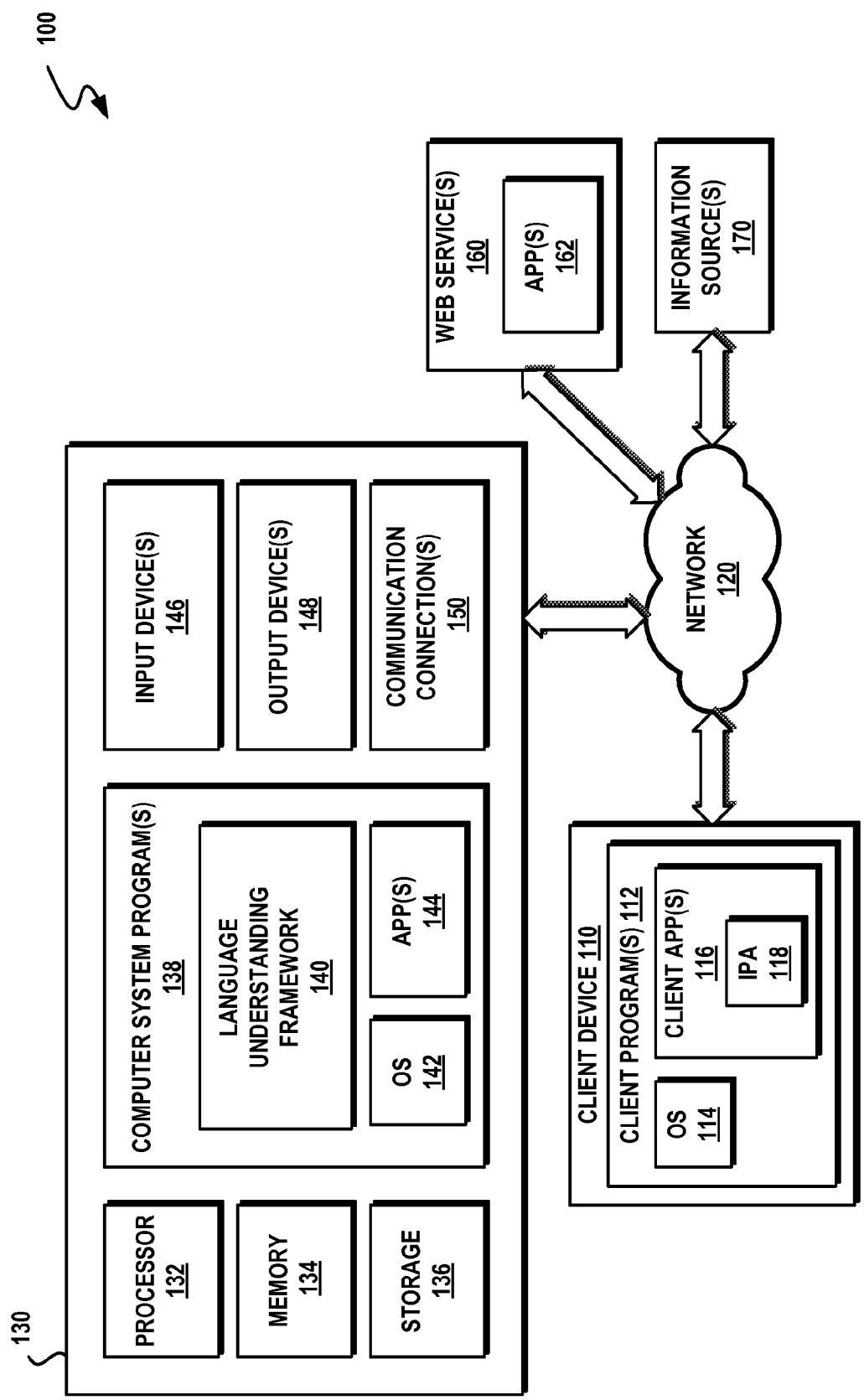
FIG. 1 illustrates an embodiment of an exemplary operating environment that may implement aspects of the described subject matter.

FIG. 1 illustrates an operating environment 100 as an embodiment of an exemplary operating environment that may implement aspects of the described subject matter. In one implementation, operating environment 100 includes a client device 110 communicatively coupled via a network 120 to a computer system 130. It is to be appreciated that operating environment 100 may be implemented by a client-server model and/or architecture as well as by other operating environment models and/or architectures in various embodiments.

In various implementations, client device 110 and computer system 130 may be configured to communicate via network 120. Network 120 may be implemented by any type of network or combination of networks suitable for facilitating communication between client device 110 and computer system 130. Network 120 may include, for example and without limitation: a wide area network (WAN) such as the Internet, a local area network (LAN), a private network, a public network, a packet network, a circuit-switched network, a wired network, and/or a wireless network. Client device 110 and computer system 130 may communicate over network 120 using various communication protocols and/or data types (e.g., binary data, text data, eXtensible Markup Language (XML) data, Hypertext Markup Language (HTML) data, Simple Object Access Protocol (SOAP) data, Remote Procedure Call (RPC) data, web service call data, message data, and the like).

Client device 110 may be implemented by one or more computing devices. Client device 110 may be implemented, for example, by a mobile computing device such as: a mobile phone (e.g., a cellular phone, a smart phone such as a Microsoft® Windows® phone, an Apple iPhone, a BlackBerry® phone, a phone implementing a Google® Android™ operating system, a phone implementing a Linux® operating system, or other type of phone implementing a mobile operating system), a tablet computer (e.g., a Microsoft® Surface® device, an Apple iPad™, a Samsung Galaxy Note® Pro, or other type of tablet device), a laptop computer, a notebook computer, a netbook computer, a personal digital assistant (PDA), a portable media player, a handheld gaming console, a wearable computing device (e.g., a smart watch, a head-mounted device including smart glasses such as Google® Glass™, a wearable monitor, etc.), a personal navigation device, a vehicle computer (e.g., an on-board navigation system), a camera, or other type of mobile device.

Client device 110 also may be implemented by a stationary computing device such as: a desktop computer, a personal computer, an entertainment system device, a media player, a media system or console, a video-game system or console, a multipurpose system or console (e.g., a combined multimedia and video-game system or console such as a Microsoft® Xbox® system or console, a Sony® PlayStation® system or console, a Nintendo® system or console, or other type of multipurpose game system or console), a set-top box, an appliance (e.g., a television, a refrigerator, a cooking appliance, etc.), or other type of stationary computing device. Still further, client device 110 may be implemented by other types of processor-based computing devices including digital signal processors, field-programmable gate arrays (FPGAs), program- and application-specific integrated circuits (PASIC/ASICs), program- and application-specific standard products (PSSP/ASSPs), a system-on-a-chip (SoC), complex programmable logic devices (CPLDs), and the like.

Client device 110 may include and/or run one or more client program(s) 112 implemented, for example, by software, firmware, hardware, logic, and/or circuitry of client device 110. Client program(s) 112 may be distributed to and/or installed on client device 110 in various ways. For instance, client program(s) 112 may be pre-installed on computing device 110 by an original equipment manufacturer (OEM), installed on client device 110 as part of installation of another client program, downloaded from an application store and installed on client device 110, distributed and/or installed by a system administrator using an enterprise network management tool, and distributed and/or installed in various other ways depending upon the implementation.

Client program(s) may include an operating system 114. Operating system 114 may be implemented by an operating system such as: a Microsoft® operating system (e.g., a Microsoft® Windows® operating system), a Google® operating system (e.g., a Google® Chrome OS™ operating system or a Google® Android™ operating system), an Apple operating system (e.g., a Mac OS® or an Apple iOS™ operating system), an open source operating system, or any other operating system suitable for running on a mobile, stationary, and/or processor-based computing device. It can be appreciated that client device 110 may include more than one operating system in some implementations.

Client program(s) also may include one or more client application(s) 116. One or more of client application(s) 116 may be implemented by a client application such as: a web browsing application, a communication application (e.g., a telephony application, an e-mail application, a text messaging application, an instant messaging application, and the like), a media application (e.g., a video application, a movie service application, a television service application, a music service application, an e-book application, a photo application, and the like), a calendar application, a game application, a shopping application, a payment application, a social media application, a social networking application, a news application, a sports application, a weather application, a mapping application, a navigation application, a travel application, a restaurants application, an entertainment application, a healthcare application, a lifestyle application, a reference application, a finance application, a business application, an education application, a productivity application (e.g., word processing application, a spreadsheet application, and the like), a security application, a tools application, a utility application, and/or any other type of application, application program, and/or app suitable for running on a mobile, stationary, and/or processor-based computing device.

One or more of client application(s) 116 may be configured to receive user input and respond to such user input in various ways depending upon implementation. For instance, one or more of client application(s) 116 may be configured to receive user input received via one or more input mechanisms and/or devices implemented by client device 110 and to respond to such user input. Examples of such input mechanisms and/or devices include, but are not limited to: a microphone or other voice input device, a user interface, a keyboard/keypad, a touch screen, a touch pad, a pen, a mouse, a trackball, a remote control, a game controller, a camera, a barcode reader, a video input device, laser range finder, a motion sensing device, a gesture detection device, and/or other type of input mechanism and/or device.

In various implementations, one or more of client application(s) 116 may receive verbal user input, text user input, handwritten user input, and/or other types of user input containing, for example: a question, a query, a command, a request, a statement, one or more words, one or more sequences of words, one or more terms, one or more values, one or more sub-phases, one or more phrases, one or more expressions, and the like.

One or more of client application(s) 116 may be configured to present a response to user input via one or more user interfaces and/or output mechanisms (e.g., speakers, displays, and the like). Responses from one or more of client application(s) 116 may be presented in various forms including, for example: outputting a computer-generated voice response or other audio; outputting an object such as an image, a video, a multimedia object, a document, and/or other type of object; outputting a text response; providing a link associated with responsive content; or other type of visual and/or audio presentation of a response.

As shown in FIG. 1, client application(s) 116 may include an intelligent personal assistant 118 and/or other type of conversational application in various implementations. A conversational application may be implemented as any type of application, application program, and/or app configured to engage in a dialog with a user. Intelligent personal assistant 118 may be engaged in response to a user making a statement (e.g., stating a particular name, word, and/or phrase) or performing an action (e.g., pressing an icon) that is intended to trigger intelligent personal assistant 118. Intelligent personal assistant 118 may be configured to receive one or more types of user input (e.g., verbal user input, text user input, handwritten user input, and/or other types of user input) and to provide an audio and/or visual response to such user input. Intelligent personal assistant 118 also may be configured to use any of various artificial intelligence and/or machine learning techniques to improve performance over time based on user interaction.

User input to client device 110 and/or intelligent personal assistant 118 may request intelligent personal assistant 118 to perform various types of tasks on behalf of the user. Exemplary tasks include, but are not limited to: answering a question; scheduling a meeting, alert, or other event; contacting a user-specified person by telephone, text messaging, instant messaging, or e-mail for example; performing a search; finding, obtaining, and/or rendering a user-specified media item (e.g., movie, television program, music item, game, photo, book, article, document, and the like); locating, recommending, and/or obtaining directions to a user-specified location (e.g., commercial establishment, point-of-interest, and the like); obtaining current information (e.g., current time, current or forecasted weather information, traffic conditions, sports scores or schedules, stock market information, personal finance information, and the like); finding and/or purchasing a user-specified product (e.g., merchandise, tickets to an event, and the like); posting user-specified content to a social media web site or microblogging service; recording a user-specified reminder or note; launching a user-specified application; and other types of requested actions.

Intelligent personal assistant 118 may perform various processing steps, such as accessing local and/or remote resources, in order to obtain and provide a response to user input. In the interest of user privacy, intelligent personal assistant 118 may obtain appropriate permission from a user of client device 110 for allowing intelligent personal assistant 118 to access such local and/or remote resources. For example, intelligent personal assistant 118 may be permitted by a user to access certain types of local resources such as client program(s) 112 and/or data associated with client program(s) 112.

In an example embodiment, client application(s) 116 may include intelligent personal assistant 118 and one or more other client applications, such as one or more types of client applications described above. As such, intelligent personal assistant 118 may be configured via one or more suitable interfaces (e.g., an application programming interface (API) or other data connection) to: access, obtain data from, and/or cooperate with one or more other client applications to obtain and provide a response to user input.

Furthermore, intelligent personal assistant 118 may access, obtain data from, and/or cooperate with one or more remote resources to obtain and provide a response to user input. For example, intelligent personal assistant 118 may be configured via one or more suitable interfaces (e.g., an API or other data connection) to communicate with one or more remote resources over network 120. Examples of such remote resources may include, but are not limited to: server-hosted, cloud-based, and/or online resources associated with any of the various types of client applications described above; server-hosted, cloud-based, and/or online versions of any of the various types of client applications described above; remote data stores, databases, repositories, and the like; web services, web sites, web pages, web content, and the like; and other types of server-hosted, cloud-based, and/or online applications, information sources, and/or content.

To provide a response to user input, intelligent personal assistant 118 may access one or more local and/or remote resources and obtain one or more types of information relevant to the user input and/or user. Intelligent personal assistant 118 may access one or more local and/or remote resources and obtain various types of information such as, for example: a current location of the user and/or client device 110, a contacts list, an address book, a browsing history, a listing of search queries, a listing of recent documents, a user profile (e.g., a device profile, a computer program profile, a website profile, a usage profile, and the like), and/or other types of data. It is to be understood that the foregoing examples are illustrative and non-limiting.

Intelligent personal assistant 118 also may access and cooperate with one or more local and/or remote resources to request and/or cause a local and/or remote resource to perform one or more actions. Intelligent personal assistant 118 may cooperate with one or more local and/or remote resources, for example, by: requesting and/or causing a calendar application to schedule an event, requesting and/or causing a communication application to contact a user-specified person, requesting and/or causing a search-enabled application (e.g., web browser, media, game, shopping, news, sports, weather, mapping, navigation, travel, restaurants, entertainment, healthcare, lifestyle, reference, finance, business, education, or other type of search-enabled application) to perform a search, requesting and/or causing a social media application to post user-specified content; and/or requesting and/or causing performance of other types of actions. It is to be understood that the foregoing examples are illustrative and non-limiting. As noted above, intelligent personal assistant 118 may obtain appropriate permission from a user of client device 110 for allowing intelligent personal assistant 118 to access and cooperate with such one or more local and/or remote resources.

In the embodiment shown in FIG. 1, client device 110 is capable of communicating with computer system 130. Computer system 130 may be implemented by a computing device, such as a server computer, or by multiple computing devices configured to implement one or more aspects described herein.

In some implementations, for example, computer system 130 may be implemented as a backend service in which one or more suitably-configured computing devices may perform one or more processing steps. Computer system 130 can be a distributed computing system in which components are located on different computing devices that are connected to each other through network (e.g., wired and/or wireless) and/or other forms of direct and/or indirect connections. Computer system 130 also may be implemented via a cloud-based architecture (e.g., public, private, or a combination thereof) in which services are delivered through shared data centers. It is also contemplated that some components of computer system 130 may be disposed within a cloud while other components are disposed outside of the cloud.

In its most basic configuration, computer system 130 typically includes at least one processor 132 and memory 134. Processor 132 may be implemented by one or more processors such as single-processor units, multi-processor units, single-core units, and/or multi-core units. Depending on the exact configuration and type of computer system or computing device, memory 134 may be volatile (e.g., random access memory (RAM)), non-volatile (e.g., read-only memory (ROM), flash memory, and the like), or a combination thereof.

Computer system 130 may have additional features and/or functionality. For example, computer system 130 may include hardware such as additional storage (e.g., removable and/or non-removable) including, but not limited to: solid state, magnetic, optical disk, or tape. Such additional storage is illustrated in FIG. 1 by storage 136.

Computer system 130 typically includes or may access a variety of computer-readable media. For instance, computer-readable media can embody computer-readable instructions for execution by computer system 130. Computer readable media can be any available media that can be accessed by computer system 130 and includes both volatile and non-volatile media, and removable and non-removable media. As used herein, the term "computer-readable media" includes computer-readable storage media and communication media. Memory 105 and storage 106 are examples of computer-readable storage media.

The term "computer-readable storage media" as used herein includes volatile and nonvolatile, removable and non-removable media for storage of information such as computer-readable instructions, data structures, program modules, or other data. Examples of computer-readable storage media include, but are not limited to: memory storage devices such as RAM, ROM, electrically erasable program read-only memory (EEPROM), semiconductor memories, dynamic memory (e.g., dynamic random access memory (DRAM), synchronous dynamic random access memory (SDRAM), double data rate synchronous dynamic random-access memory (DDR SDRAM), etc.), integrated circuits, solid-state drives, flash memory (e.g., NAN-based flash memory), memory chips, memory cards, memory sticks, thumb drives, and the like; optical storage media such as Blu-ray discs, digital video discs (DVDs), compact discs (CDs), CD-ROM, optical disc cartridges, and the like; magnetic storage media including hard disk drives, floppy disks, flexible disks, magnetic cassettes, magnetic tape, and the like; and other types of computer-readable storage devices. It can be appreciated that various types of computer-readable storage media may be part of computer system 130.

As used herein, the terms "computer-readable storage media" and "computer-readable storage medium" do not refer to and do not encompass a propagated signal, a modulated data signal, a carrier wave, or any other type of transitory computer-readable medium.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Embodiments may be described in the general context of "computer-readable instructions" that are executed to perform various steps, methods and/or functionality. For instance, computer-readable instructions stored on one or more computer-readable storage media may be executed by client device 110, computer system 130, processor 132, and/or other computing device to perform aspects of the described subject matter. Computer-readable instructions may be embodied by executable components such as a computer program, a software application (e.g., client and/or server applications), a routine, and the like. Computer-readable instructions may be implemented, for example, as program modules, functions, objects, methods, properties, application programming interfaces (APIs), data structures, and the like and may perform particular tasks or implement particular data types.

Computer system 130 may include and/or run one or more computer system program(s) 138 implemented, for example, by software, firmware, hardware, logic, and/or circuitry of computer system 130. Computer system program(s) 138 may be stored in computer-readable storage media such as memory 134 or storage 136, for example. In one embodiment, computer system program(s) 138 may include or implement computer-readable instructions that are configured to perform various steps, methods and/or functionality in accordance with the described subject matter. For instance, computer system program(s) 138 may include or implement a language understanding framework 140, which will be described in greater detail below.

Computer system program(s) 138 may include an operating system 142. Operating system 142 may be implemented, for example, by one or more of the various types of operating systems described above and/or other type of operating system suitable for running on computer system 130.

Computer system program(s) 138 may include one or more computer system application(s) 144. Computer system application(s) 144 may be implemented, for example, by: one or more server-hosted, cloud-based, and/or online applications associated with any of the various types of client applications described above; one or more server-hosted, cloud-based, and/or online versions of any of the various types of client application described above; one or more applications configured to provide a web service, a web site, a web page, web content, and the like; one or more applications configured to provide and/or access an information source, data store, database, repository, and the like; and/or other type of application, application program, and/or app suitable for running on computer system 130. By way of illustration and not limitation, computer system application(s) 144 may include one or more of a dialog application, a scheduling application, and/or a search application for providing services to one or more of client application(s) 116 (e.g., intelligent personal assistant 118, calendar application, search-enabled application, etc.).

Computer system 130 also may include input device(s) 146 and output device(s) 148. Input device(s) 146 may include any of the various types of input devices described above and/or other type of input mechanism and/or device. Output device(s) 148 may include one or more displays, projectors, speakers, printers, and/or other type of output mechanism and/or device.

Computer system 130 may contain one or more communication connection(s) 150 that allow computer system 130 to communicate with other devices. Communication connection(s) 150 may be used in the context of communicating over network 120 with client device 110. Communication connection(s) 150 also may allow computer system 130 to communicate over network 120 with one or more web service(s) 160 (e.g., an affiliated web service, a third-party web service, a remote web service, and the like), one or more web service application(s) 162 (e.g., an affiliated web service application, a third-party web service application, a remote web service application, and the like), and/or one or more information source(s) 170 (e.g. an affiliated information source, a third-party information, a remote information, and the like). As such communication connection(s) 150 may be used in the context of accessing, obtaining data from, and/or cooperating with various types of resources.

Communication connection(s) 150 may further be used in the context of distributing computer-readable instructions over network 120. For example, computer-readable instructions can be combined or distributed utilizing remote computers and storage devices. A local or terminal computer may access a remote computer or remote storage device and download a computer program or one or more parts of the computer program for execution. It also can be appreciated that the execution of computer-readable instructions may be distributed by executing some instructions at a local terminal and executing some instructions at a remote computer.

Exemplary Framework for Entity and Attribute Resolution

FIG. 1 illustrates language understanding framework 140 as an embodiment of an exemplary framework for entity and attribute resolution in accordance with the described subject matter. In one implementation, language understanding framework 140 may be implemented by computer system 130 and/or computer-readable instructions that are stored on a computer-readable storage medium and configured to perform various steps, methods and/or functionality in accordance with the described subject matter. It is to be appreciated that language understanding framework 140, or portions thereof, may be implemented by other computer systems and/or other computing devices including, but not limited, to client device 110, web service(s) 160, and/or information source(s) 170. It is also to be appreciated that language understanding framework 140, or portions thereof, may be implemented by software, hardware, firmware or a combination thereof in various embodiments.

In one implementation, language understanding framework 140 may be configured to provide various services related to language understanding in response to user input. For example, language understanding framework 140 may provide language understanding services in support of one or more applications (e.g., client application(s) 116, computer system application(s) 144, and/or web service application(s) 162) and/or interfaces provides by such one or more applications. Language understanding framework 140 may be configured via one or more suitable interfaces (e.g., an API or other data connection) to communicate with various components of client device 110, computer system 130, web service(s) 160, and/or information source(s) 170. In the interest of user privacy, language understanding framework 140 may obtain appropriate permission from a user of client device 110 for allowing language understanding framework 140 to communicate with such components. For instance, language understanding framework 140 may be permitted by a user to access and employ personalized information about the user and/or parameters of client device 110.

In one or more embodiments, language understanding framework 140 may be a component an application and configured to provide various language understanding services that support the functionality of such application. In one or more other embodiments, language understanding framework 140 may support the functionality of an application by providing language understanding services as a separate service and/or component of another application.

Language understanding framework 140 may be configured to receive user input expressed as text. In one or more scenarios, language understanding framework 140 may receive text that is input by a user into a user interface presented by client device 110 and that is transmitted over network 120 to computer system 130. In one or more other scenarios, a spoken utterance of a user that is captured by client device 110 may undergo speech recognition at client device 110 and/or at computer system 130 and may be converted into text user input that is received by language understanding framework 140. In one embodiment, for example, computer system 130 may be configured to receive an audio representation of a spoken utterance over network 120 and to provide speech recognition functionality as part of language understanding framework 140 or as a separate service. It is to be appreciated that client device 110 may capture various other types of user input (e.g., handwritten user input, touch user input, gesture user input, and the like) that can be converted into text user input by client device 110 and/or computer system 130 for processing by language understanding framework 140. It is also to be appreciated that various types and/or modalities of user input can be combined with text user input to be processed by language understanding framework 140.

User input received by language understanding framework 140 may represent one or more of: a question, a query, a command, a request, a statement, one or more expressions, one or more words, one or more sequences of words, one or more terms, one or more values, one or more sub-phases, one or more phrases, one or more expressions, and the like. In accordance with the described subject matter, language understanding framework 140 may be configured to perform various operations to analyze and/or process user input. By way of illustration and not limitation, language understanding framework 140 may analyze and/or process user input that requests one or more applications (e.g., client application(s) 116, computer system application(s) 144, and/or web service application(s) 162) to perform a particular task.

In one example embodiment, language understanding framework 140 may be configured to perform various operations to analyze text contained in user input to resolve an ambiguous representation of one or more entities. It is to be appreciated that entities may extend beyond named entities to entity attributes and other concepts. By way of illustration and not limitation, text contained in user input may represent and/or refer to an entity such as: a person, a group, an organization, a team, an item, a product, a price, a price range, a value, a value range, a quantity, a time, a point in time, a time period, a date, a duration, a place, an establishment, a location, an address, an activity, an event, an occurrence, a purpose, a condition, a category, an attribute, a property, a type, a genre, a rating, and/or other type of named entity, entity category, entity attribute, tangible object, and/or abstract concept.

In various implementations, an entity may be identified in an entity knowledge source, such as an entity knowledge base, entity catalog, entity corpus, entity repository, entity database, entity data set, and the like. An entity knowledge source may be implemented, for example, as a structured knowledge source pertaining to a closed set of entities and may be configured to provide services and/or store information related to the closed set of entities. Within an entity knowledge source, each entity may be uniquely identified and/or otherwise distinguished from other entities. For example, a knowledge base of entities may refer to each entity by a normalized value such as a canonical name, canonical form, unique reference number, globally unique identifier, universally unique identifier, and/or other type of value capable of distinguishing an entity. Within an entity knowledge source, entities may be associated with various categories, attributes, properties, descriptions, metadata, and/or other types of information that allow such entities to be organized, searched, and/or retrieved.

User input received by language understanding framework 140 may contain text that represents natural language user input. For example, user input may contain text that represents an entity using a surface form of the entity rather than a canonical name. A surface form of an entity may include, without limitation: an alias, a pseudonym, a variant, a synonym, a related entity, a paraphrase, an incomplete specification, an incomplete value, a misspelling, a mispronunciation, and the like. As such, a representation of an entity may be ambiguous when a surface form is used to describe the entity. For example, a surface form of an entity may not clearly or completely identify the entity, may not uniquely identify or address the entity, may not comply with a structure (e.g., address structure, categorization structure, format structure, and the like) utilized by a resource (e.g. application, web service, and/or information source) from which the user desires a response, and/or may otherwise be determined to be ambiguous.

User input received by language understanding framework 140 may also contain text that represents an entity attribute, such as: an entity property, entity characteristic, entity category, entity classification, entity descriptor, and the like. In some cases, an entity attribute may be an entity. In various implementations, language understanding framework 140 may be configured to resolve a surface form and/or other type of ambiguous representation of an entity and/or entity attribute by performing one or more types of entity normalization. The type of entity normalization employed by language understanding framework 140 may depend, for instance, upon the nature of the user input and the target set of normalized values.

The following exemplary embodiments, implementations, examples and scenarios related to entity normalization are provided to further illustrate aspects of the described subject matter. It is to be understood that the following examples are provided by way of illustration only and that language understanding framework 140 may perform various types of entity normalization for various types of entities and/or types of entity attributes.

Deterministic Normalization

As one example of normalization, language understanding framework 140 may be configured to perform deterministic and/or domain-independent normalization using a set of normalization rules. For instance, user input received by language understanding framework 140 may contain text representing one or more of: a temporal expression (e.g., a date, a time, a duration, a frequency, and the like); a geographic expression (e.g., an address, a geographic location, a place, and the like); a numerical expression (e.g., a monetary value, a quantity, a percentage, a phone number, and the like); and/or other type of domain-independent expression. By way of illustration and not limitation, language understanding framework 140 may be configured to perform deterministic and/or domain-independent normalization by applying a set of normalization rules to map such one or more temporal, geographic, and/or numerical expressions to a canonical machine-readable format (e.g., DateTime format, geographic data format, currency format, telephone number format, etc.).

A scenario in which a type of entity and/or entity attribute may be normalized using a set of normalization rules is when user input contains text that represents a surface form of a point in time. In this case, language understanding framework 140 may employ a set of normalization rules that maps various temporal expressions that may be used to describe the point in time (e.g., recent, tomorrow, in two weeks, in two hours, etc.) to a normalized form (e.g., machine-readable DateTime format) with respect to a current time reference and/or query session related time reference.

Another scenario in which a type of entity and/or entity attribute may be normalized using a set of normalization rules is when user input contains text that represents a surface form of a location. In this case, language understanding framework 140 may employ a set of normalization rules that maps various geographic expressions that may be used to describe the location (e.g., close, nearby, within 2 miles, etc.) to a normalized form (e.g., machine-readable geographic data format) with respect to a current location of the user and/or user device (e.g., client device 110).

Normalization Using Lookup Tables

As another example of normalization, language understanding framework 140 may be configured to perform normalization using one or more lookup tables. By way of illustration and not limitation, received user input may contain text representing a surface form of an entity and/or entity attribute, and language understanding framework 140 may be configured to perform normalization by using one or more lookup tables to map the surface form to a canonical name. For instance, enumerable (e.g., small or medium pluralities) types of entities and/or types of entity attributes may be normalized by language understanding framework 140 using one or more lookup tables.

A scenario in which a type of entity and/or entity attribute may be normalized using a lookup table is when user input contains text that represents a surface form of a sports team. In this case, language understanding framework 140 may employ a lookup table that correlates various surface forms that may be used to describe the sports team (e.g., Oakland Athletics, A's, Oakland MLB, etc.) with the canonical name of the sports team (e.g., Oakland Athletics).

Another scenario in which a type of entity and/or entity attribute may be normalized using a lookup table is when user input contains text that represents a surface form of a movie genre. In this case, language understanding framework 140 may employ a lookup table that correlates various surface forms that may be used to describe the movie genre (e.g., comedy, comedies, funny, humor, slapstick, etc.) with the canonical name of the movie genre (e.g., comedy).

Normalization Using Machine Learned Methods

As a further example of normalization, language understanding framework 140 may be configured to perform normalization using machine learned methods. By way of illustration and not limitation, received user input may contain text representing a surface form of an entity and/or entity attribute, and language understanding framework 140 may be configured to perform normalization by using one or more machine learned techniques to map the surface form to a canonical name. For instance, enumerable (e.g., small or medium pluralities) types of entities and/or types of entity attributes may be normalized by language understanding framework 140 using one or more machine learned techniques.

In various embodiments, language understanding framework 140 may be configured to perform normalization using one or more of: supervised learning techniques (e.g., Support Vector Machine (SVM), Conditional Random Fields (CRFs), decision tree (e.g., boosted, bootstrap aggregated, ensemble, random forest, and the like), k-Nearest Neighbors (k-NN), Naive Bayes, Bayesian networks, neural networks, logistic regression, and the like); unsupervised learning techniques (e.g., clustering (e.g., k-mean, mixture model, hierarchical, and the like), hidden Markov models, blind signal separation, and the like); semi-supervised learning techniques; data mining techniques; and/or other artificial intelligence and/or machine learning techniques.

A scenario in which a type of entity and/or entity attribute may be normalized using one or more machine learned techniques is when user input contains text that represents a surface form of a weather condition. In this case, language understanding framework 140 may employ one or more machine learned techniques to map various surface forms that may be used to describe the weather condition (e.g., use umbrella, use gloves, use gloves and hat, snow tires, etc.) to the appropriate canonical name of the weather condition (e.g., rain, cold, snow, etc.).

Normalization Using an Entity Normalization Index

As another example of normalization, language understanding framework 140 may be configured to perform normalization using an entity normalization index. By way of illustration and not limitation, received user input may represent a query for an entity and/or entity attribute, and language understanding framework 140 may be configured to employ an entity normalization index for retrieving a normalized value and/or list of most relevant normalized values. For instance, when user input contains large variability and maps into a large set of normalized values, language understanding framework 140 may frame and/or solve normalization as a document retrieval problem using an entity normalization index.

In one embodiment, an entity normalization index may be created and/or updated by language understanding framework 140. For instance, language understanding framework 140 may build and/or modify an entity normalization index by obtaining entities and associated metadata to include in the entity normalization index from one or more information source(s) 170. As an example, language understanding framework 140 may extract and/or collect a closed set of entities together with associated metadata (e.g., descriptors, property types, user preferences, consumption statistics, uniform resource locators (URLs) that link to additional information, and the like) from an entity knowledge source. It can be appreciated that an entity normalization index may be created prior to and/or as a separate process (e.g., offline process) from various types of processing that may be performed to normalize user input, which may occur at runtime for instance.

Language understanding framework 140 also may access web service(s) 160 and/or various types of other information source(s) 170 to discover, extract, and/or obtain other types of information to include in the entity normalization index. For example, language understanding framework 140 may access one or more types of: knowledge sources (e.g., knowledge bases, catalogs, repositories, databases, data sets, and the like), knowledge graphs (e.g., Microsoft® Satori, Google® Knowledge Graph, Facebook® Open Graph, Freebase, other entity graphs, and the like), web search logs (e.g., query logs, hyperlink logs, click-through logs, query-click logs, hyperlink graphs, query-click graphs, and the like), web corpora (e.g., web services, web sites, web pages, web documents, and the like), and/or other types of information resources.

Language understanding framework 140 may discover, extract, and/or obtain various types of information related to the entities, such as: alternate surface forms of entities and/or entity attributes, entity relationships, related entities (e.g., directly related entities, entities indirectly related within a threshold degree of separation, and the like), related categories, related properties, related queries (e.g., user queries, web search queries, web service queries, knowledge base queries, catalog queries, repository queries, database queries, recommended queries, and the like), related links (e.g., uniform resource locators (URLs), related URLs, authoritative URLs, and the like), related text (e.g., surrounding text, anchor text for URLs, and the like), related web documents (e.g., authoritative web documents, related search engine results pages (SERPs), related SERP summaries, and the like), related scores (e.g., query recommendation scores, association scores, and the like), related metadata (e.g., descriptors, property types, user preferences, consumption statistics, clicks, impressions, frequency counts, and the like), and/or other types of related information.

In various implementations, language understanding framework 140 may associate one or more entities within the normalization index with various types of related information extracted and/or obtained from one or more information source(s) 170. For example, data may be collected from knowledge graphs, web logs, and/or web documents in order to create corpora with associations of surface forms and normalized forms.

Language understanding framework 140 may be configured to use multiple sources of information as references and/or may be configured to generate signals or factors that may be used to determine the best mapping from input text to normalized entity output. For instance, information derived from related queries, related web documents, related metadata, and/or the like may be used to determine the relevance of one or more entities within the entity normalization index to input user text. Related data that is associated with the entities within the entity normalization index may be used as features either directly or through one or more types of processing such as: lexical processing, syntactic processing, semantic processing, contextual processing, and the like.

In one or more embodiments, an entity normalization index may be implemented as an index of entities and their associated features. Examples of features that may be associated with an entity may include, for instance: ngrams (e.g., words, letters, syllables, phonemes, and the like), lexical features (e.g., unigrams, bigrams, variants, surface forms, and the like), semantic features (e.g., categories, properties, related entities, related queries, and the like), contextual features (e.g., surrounding words, related text, related references, related links, use cases, and the like), latent features (e.g., implicit entity information, inferred entity relationships, and the like), personalized features (e.g., user preferences, user demographics, popularity, and the like), metadata features (e.g., association strength, query popularity, entity popularity, descriptors, and the like), and/or other types of information.

In one implementation, language understanding framework 140 may receive user input containing text representing one or more phrases, sub-phrases, and/or other type of surface form of an entity. Language understanding framework 140 may process user input to extract one or more types of features that correspond to types of features associated with entities within an entity normalization index. Language understanding framework 140 may use one or more features extracted from user input to request and/or retrieve one or more normalized entities, normalized entity attributes, and/or normalized values from an entity normalization index.

In one or more embodiments, an entity normalization index may return a canonical entity or ranked list of canonical entities that match natural language text. The canonical entity returned by entity normalization index may represent the normalized entity that best matches text contained in user input. The ranked list of entities returned by the entity normalization index may represent normalized entities that are most relevant to text contained in user input. Alternatively or additionally, language understanding framework 140 can retrieve an entity that best matches the text contained in user input and/or a list of entries most relevant to text contained in user input. It can be appreciated that various types of rapid, efficient and scalable indexing, ranking, and/or retrieval algorithms may be employed by language understanding framework 140 to construct, update, and/or employ entity normalization index.

A scenario in which language understanding framework 140 may perform normalization using an entity normalization index is when user input represents a query for a movie title that is directed, for example, to a movie service and/or catalog of movie titles. In this case, language understanding framework 140 may use the query (e.g., find the most recent action Tom Cruise movie) and/or sub-phrases within the query to retrieve a normalized entity (e.g., Mission: Impossible Ghost Protocol) from the entity normalization index. Language understanding framework 140 may be configured to use the normalized value to construct a request to the movie service and/or catalog of movie titles, which may employ a structured database. As such, language understanding framework 140 may enable retrieval of the appropriate movie in cases where user input describes the movie using a natural language expression and the movie service and/or catalog of movie titles does not support natural language requests.

In one embodiment, language understanding framework 140 may be configured to use various types of information for processing a request to and/or a response from entity normalization index. For example, language understanding framework 140 may be configured to use information such as: personalized information about a user (e.g., user profile, user preferences, user location, previous queries, previous choices, previous selections, a prior dialog turn, semantic information inferred from an utterance, and the like), query information (e.g., contextual information from words proximate to and/or surrounding an entity, query popularity, and the like), entity information (e.g., entity popularity among user populations, information about entity recency, latent features and/or inherent information about entities, and the like), client device 110 and/or computer system 130 parameters, and/or machine learned models. It can be appreciated that, in some cases, one or more of such types of information may not be encoded in entity normalization index.

In one or more implementations, language understanding framework 140 may be configured to use personalized information about a user, query information, entity information, client device 110 and/or computer system 130 parameters, and/or machine learned models for incorporating one or more features into a request to an entity normalization index. For example, a prior dialog turn and/or prior query from a user (e.g., find the most recent action Tom Cruise movie) may be processed by language understanding framework 140 and used to supply additional information (e.g., movie, action, most recent, and/or tom cruise) that can be incorporated as one or more features to supplement features extracted from a current dialog turn or user query (e.g., the one with Jeremy Renner).

In one or more implementations, language understanding framework 140 may be configured to use personalized information about a user, query information, entity information, client device 110 and/or computer system 130 parameters, and/or machine learned models for processing a response from entity normalization index, such as a ranked list of canonical entities that match natural language text. For instance, language understanding framework 140 may use information such as a user profile, a user preference, a user location, entity popularity, entity recency, and/or the like to re-rank and/or prune a list of canonical entities returned from an entity normalization index. As an example, user input (e.g., when is the next sox game, find me a ticket to the next giants game, etc.) may be processed to return a list that includes upcoming games for different sports teams (e.g., Boston Red Sox and Chicago White Sox games, New York Giants and San Francisco Giants games, etc.) and that may be ranked and/or pruned by language understanding framework 140 based on a user profile, a user location, user preferences, and the like.

Domain Ambiguity Resolution

In one or more embodiments, language understanding framework 140 may be configured to handle and/or resolve domain ambiguity. By way of illustration and not limitation, received user input may contain text that describes entities in multiple domains, and language understanding framework 140 may be configured to resolve domain ambiguity. Examples of domains include, but are not limited to: movie, television, music, books, photos, communication, calendar, assistant, game, shopping, product, news, sports, weather, maps, navigation, travel, restaurant, social media, entertainment, health, lifestyle, reference, finance, business, education, productivity, security, tools, utility, and/or other types of categories.

It can be appreciated that various surface forms (e.g., Harry Potter and the Goblet of Fire, Harry Potter 4, Harry Potter IV, Harry Potter four, fourth Harry Potter, Goblet of Fire, etc.) may map to a normalized value (e.g., Harry Potter and the Goblet of Fire) that describes entities in multiple domains (e.g., books domain, movie domain, music domain, game domain, etc.). In one implementation, language understanding framework 140 may be configured to handle domain ambiguity by mapping to multiple normalized entities and determining a weight, relevance, confidence, score, rank, and/or other type of measure associated each normalized entity. Language understanding framework 140 may be configured to provide a weighted, ranked, and/or scored listing of the multiple entities as output.

In various embodiments, language understanding framework 140 also may be configured to perform other types of processing to resolve domain ambiguity and/or entity ambiguity. Examples of such other types of processing may include, but are not limited to: domain detection techniques, intent detection techniques, lexical processing techniques, syntactic processing techniques, semantic processing techniques, contextual processing techniques, and/or other types of processing.

Domain-Dependent Normalization

In various implementations, one or more types of normalization performed by language understanding framework 140 may employ a broader scope of linking related entities to normalized values (e.g., canonical names, canonical forms, etc.) within the context of a particular domain. For instance, language understanding framework 140 may be configured to address a type of entity that is deemed relevant to and/or associated with a particular domain and that may be described by several surface forms which require mapping to a canonical form. In one example embodiment, language understanding framework 140 may be configured to perform domain-dependent normalization to map natural language expressions and/or other types of surface forms to domain-dependent (e.g., domain-relevant, domain-specific, and the like) entities and/or entity attributes.

A scenario in which a type of entity and/or entity attribute may be normalized in the context of particular domain is when user input requests a particular movie and contains text that represents a surface form of a movie genre. In this case, language understanding framework 140 may employ domain-dependent normalization within the context of the movie domain, which may be associated with a set of domain-dependent entities and/or entity attributes (e.g., movie, movie title, movie genre, release date, movie star, movie character, movie rating, and the like). As such, language understanding framework 140 may be configured to analyze user input, identity a surface form (e.g., comedy, comedies, funny, humor, slapstick, etc.) of one or more domain-dependent entities and/or entity attributes (e.g., movie genre) within the text, and map the surface form to a normalized value (e.g., the canonical name comedy).

Another scenario in which domain-dependent normalization may be employed is when the user input contains text that represents a surface form of a sports domain-dependent entity and/or entity attribute (e.g., sports schedule, sports stats, sports standings, and the like), and language understanding framework 140 maps a surface form (e.g., schedule, upcoming games, fixtures, and the like) to the canonical name of a sports-domain dependent entity and/or entity attribute (e.g., sports schedule). A further scenario of domain-dependent normalization is when language understanding framework 140 maps a surface form of a cost (e.g., cheap, expensive, and the like) to the canonical name of a restaurant domain-dependent entity and/or entity attribute (e.g., price range).

In various implementations, one or more types of normalization performed by language understanding framework 140 may rely on data driven methodologies for constructing normalization rules and trained models that produce normalization. In one or more implementations, data may be collected from ongoing interactions with preliminary versions of language understanding framework 140 and/or by leveraging usage data across one or more similar domains. Regarding deterministic normalization, such as for temporal expression normalization, data with temporal sub-phrases can be collected in similar domains to a target domain and used as a data set to construct a set normalization rules.

In one or more implementations, data can be collected from search engine query logs and text documents in order to create corpora with associations of surface forms and normalized forms for performing various types of normalization and/or disambiguation methodologies. It can be appreciated that normalization rules and/or normalization models may be constructed, trained, and/or refined using various types of artificial intelligence and/or machine learning techniques including, for example: supervised learning techniques, semi-supervised learning techniques, unsupervised learning techniques, and/or combination thereof.

Language understanding framework 140 may be applicable for various applications that link user input expressed as text to structured output, such as normalized entities and/or identifiers that link the input text with a specific response that a host system should provide. For example, language understanding framework 140 may be configured to map user input sub-phrases to entities represented as normalized text objects or as identifiers linking to catalog entries. In one or more implementations, language understanding framework 140 may perform normalization of catalog entity variants for linking into a closed set of entities. For instance, language understanding framework 140 may perform one or more types of normalization for mapping surface forms to canonical names in a catalog or knowledge base that provides a list of known entities. One or more types of normalization may be performed by language understanding framework 140 to match a given surface form with one of more catalog entities and/or to provide one or more types of scores indicating goodness of the match.

Exemplary embodiments of the described subject matter may provide various attendant and/or technical advantages. By way of illustration and not limitation, user experience and/or system performance may be improved by language understanding framework 140 through one or more of: analyzing query logs within a domain of interest to discover paraphrases and frequent surface forms for domain-dependent entities and entity attributes; accessing multiple knowledge sources such as one or more web logs, knowledge graphs, web corpora, and the like to generate entity features, factors and/or signals that determine the best mapping from input text to normalized entity output; using metadata from queries and weblogs to provide information regarding association strength and the popularity of queries and catalog entries; using latent features, personalized features, contextual features, and/or semantic features, which may be not be encoded by an entity normalization index, for entity retrieval and/or processing responses from the entity normalization index; and/or discovering surface forms for catalog entities from query logs that associate alternate phrases for the catalog entries.

User experience and/or system performance also may be improved by various implementations of language understanding framework 140 through one or more of: detecting and normalizing ambiguous surface forms of entities contained in user input; using information obtained from multiple knowledge sources such as one or more web logs, knowledge graphs, web corpora, and the like to perform probabilistic retrieval of canonical references; returning ranked lists of results with associated relevance scores; and/or enabling users to query using natural language user input and to retrieve appropriate responses from services and/or applications that do not support natural language queries.

Further, user experience and/or system performance may be improved by one or more of: extending the scope of normalization beyond named entities to entity attributes and other concepts, improving matching accuracy, reducing the need for query refinement and/or subsequent querying, reducing the likelihood of empty results, and/or accurately providing and scoping results in accordance with user intent. As such, various attendant and/or technical advantages may be provided in terms of improved efficiency and/or savings with respect to power consumption, memory, processor cycles, and/or other computationally-expensive resources.

Exemplary Process for Entity and Attribute Resolution

Figure 2:
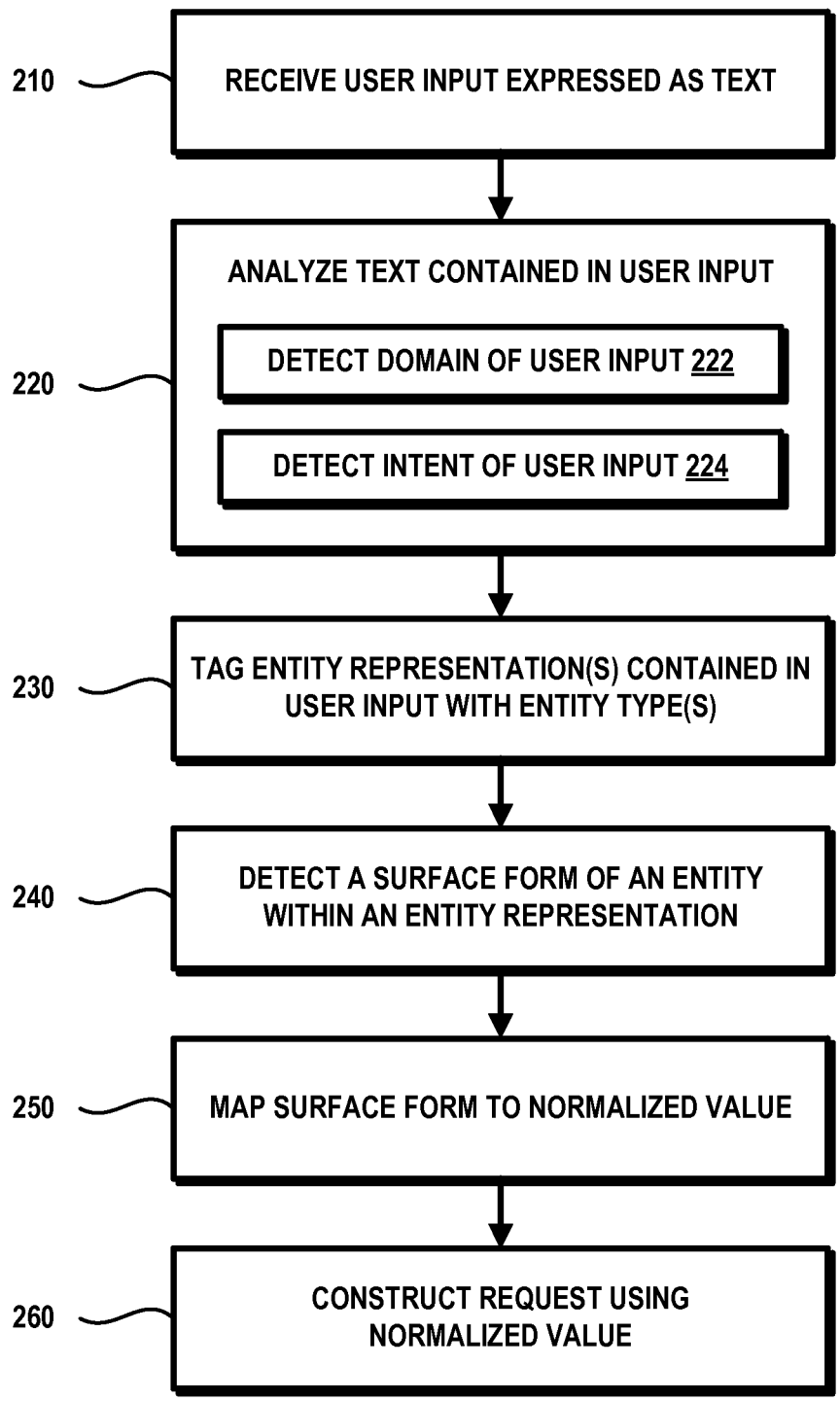
FIG. 2 illustrates an embodiment of an exemplary process for entity and attribute resolution.

FIG. 2 illustrates a computer-implemented method 200 as an embodiment of an exemplary process for entity and attribute resolution in accordance with aspects of the described subject matter. In one implementation, computer-implemented method 200 may be performed by language understanding framework 140. It is to be appreciated that computer-implemented method 200, or portions thereof, may be performed by other components and may be implemented by software, hardware, firmware or a combination thereof in various embodiments.

At 210, user input expressed as text may be received. The received user input may contain text that was input by a user into a user interface and/or transmitted over network 120. Alternatively or additionally, the received user input may contain text converted from one or more of: verbal user input, handwritten user input, touch user input, gesture user input, and the like that was captured and/or converted by client device 110 and/or computer system 130.

At 220, text contained in user input may be analyzed. In one or more embodiments, text contained in user input may be analyzed using various types of lexical processing, syntactic processing, semantic processing and/or contextual processing for determining a type of response, such as an application response, and/or determining a type of task that is requested by the user input. In some embodiments, analyzing text contained in user input may include performing domain detection and/or intent detection.

At 222, a domain of user input may be detected. For example, text contained in user input may be analyzed to determine a domain of the user input. In various implementations, a user interface, application and/or service that is supported by and/or that incorporates language understanding framework 140 may be configured to provide services related to multiple domains (e.g., movies, music, games, etc.). As such, domain detection may be performed to identify a domain that is most relevant to user input. Alternatively and/or additionally, domain detection may be performed to identity a most relevant sub-domain (e.g., hotel) of a particular domain (e.g., travel). It can be appreciated that in domain-specific implementations, domain detection may be inherent and/or unnecessary.

In one or more embodiments, domain detection may involve parsing text contained user input; determining lexical features (e.g., n-grams), syntactic features (e.g., parts-of-speech), semantic features (e.g., entities named in the user input), and/or contextual features (e.g., previous query or dialog turn) of parsed text; associating a set of domains with user input based on lexical, syntactic, semantic, and/or contextual features; and/or classifying user input based on a most probable domain. It can be appreciated that the presence of particular entities (e.g., actors) or words (e.g., movie) within user input may be strong indicators of a specific domain. It also can be appreciated that sequentially received user input often relates to a common domain.

In various implementations, domain classification can employ one or more machine learned techniques (e.g., supervised, semi-supervised, unsupervised, and/or combination thereof) based on probabilistic and/or statistical-based models including, for example: generative models (e.g., hidden Markov models, Naive Bayes, probabilistic context free grammars, and the like), discriminative models (e.g., Support Vector Machine (SVM), Conditional Random Fields (CRFs), decision trees, neural networks, linear regression, and the like), and/or a combination thereof. The one or more machine learned techniques used for domain detection may be trained and/or refined based on: data collected from ongoing interactions and/or observations in the domain and/or in similar domains, data collected from one or more information source(s) 170 (e.g., knowledge graphs, web logs, and/or web documents), and/or data collected from an entity normalization index.

In one example embodiment, domain detection may employ one or more supervised machine learning techniques based on discriminative statistical models, such as SVM learning and/or decision tree (e.g., boosted decision tree) learning. By way of illustration and not limitation, domain detection may involve mapping the user input to a space that corresponds to a particular domain (e.g., SVM learning) and/or may involve matching user input to a particular node in a hierarchical tree of domain types.

At 224, an intent of user input may be detected. For example, text contained in user input may be analyzed to determine an intent of the user input. In various implementations, a user interface, application and/or service that is supported by and/or that incorporates language understanding framework 140 may be configured to provide multiple services (e.g., search/play movies, search/play music, search/play game, etc.) and/or support various types of tasks within a domain and/or among different domains. As such, intent detection may be performed to identify an intent (e.g., find movie) as a task that is most relevant to the user input. It can be appreciated that in task-specific implementations, intent detection may be inherent and/or unnecessary.

In one or more embodiments, intent detection may involve parsing text contained in user input; determining lexical features (e.g., n-grams), syntactic features (e.g., parts-of-speech), semantic features (e.g., entities named in the user input), and/or contextual features (e.g., previous query or dialog turn) of parsed text; associating a set of tasks with user input based on lexical, syntactic, semantic, and/or contextual features; and/or classifying user input based on a most probable task. Exemplary tasks include, but are not limited to: answering a question; scheduling a meeting; contacting a person; performing a search; finding and/or rendering a user-specified media item; obtaining directions; obtaining current information; shopping for a product; posting social media content; and other types of actions.

It can be appreciated that the presence of particular entities (e.g., actors) or words (e.g., movie) within user input may be strong indicators of a specific task. It also can be appreciated sequentially received user input often relates to a common task. In addition, dependency relationships of certain n-grams in user input may correlate closely to user intent. For instance, n-grams (e.g., find and movies) that appear in user input (e.g., find the most recent action tom cruise movies) may have a predicate-argument relationship that may correlate closely to intent (e.g., find movie).

In various implementations, intent classification can employ one or more machine learned techniques such as those used for domain detection and/or other types of artificial intelligence and/or machine learned techniques. The one or more machine learned techniques used for intent detection may be trained and/or refined based on data collected from ongoing interactions and/or observations in the domain and/or in similar domains, data collected from one or more information source(s) 170 (e.g., knowledge graphs, web logs, and/or web documents), and/or data collected from an entity normalization index.

In one example embodiment, intent detection may employ one or more supervised machine learning techniques based on discriminative statistical models, such as SVM learning and/or decision tree (e.g., boosted decision tree) learning. By way of illustration and not limitation, intent detection may involve mapping user input to a space that corresponds to a particular task (e.g., SVM learning) and/or may involve matching user input to a particular node in a hierarchical tree of task types.

At 230, entity representation(s) contained in user input may be tagged with entity type(s). In various embodiments, text (e.g., one or more words, one or more sequences of words, one or more terms, one or more values, one or more sub-phases, one or more phrases, one or more expressions, and the like) that represents one or more entities may be identified, classified and/or or tagged based on a type of task and/or a set of entity types. In various implementations, entity types may be associated with a type of task and/or response, may be utilized by an application configured to provide a type of application response, and/or may correspond to a set of domain-dependent entity attributes. It is to be appreciated that entities may extend beyond named entities to entity attributes and other concepts.

In some embodiments, entity representations contained in user input may be tagged with entity types associated with a particular domain. In various implementations, a particular domain (e.g., movie) may be associated with a set of entity types that corresponds to a set of domain-dependent entities and/or entity attributes (e.g., movie, movie title, movie genre, release date, movie star, movie character, movie rating, and the like). As such, user input may be analyzed to identify text that represents an entity and to tag the text with an entity type corresponding to one of the entity types associated with the particular domain.

In one or more embodiments, a user interface, application and/or service that is supported by and/or that incorporates language understanding framework 140 may be configured to provide services related to a type of task, response and/or domain. In such embodiments, a set of entities and/or entity attributes associated with such user interface, application and/or service may be implemented as a set of entity types to be used for tagging entity representations within the user input.

In various implementations, entity tagging may involve lexically, syntactically, semantically and/or contextually processing user input to: parse text; determine a most probable sequence of entity types; and/or tag text contained in user input with one or more possible entity types. In some embodiments, entity representations contained in the user input may be tagged with slot types that may correspond to a set of entity types. For example, user input may be processed as a sequence of slots that is filled by labeling text contained in user input with possible slot types to fill the slots of the sequence.

In various implementations, entity tagging can employ one or more machine learned techniques such as the classification techniques described above and/or other types of artificial intelligence and/or machine learned techniques.

The one or more machine learned techniques used for entity tagging may be trained and/or refined based on data collected from ongoing interactions and/or observations in the domain and/or in similar domains, data collected from one or more information source(s) 170 (e.g., knowledge graphs, web logs, and/or web documents), and/or data collected from an entity normalization index. In one example embodiment, entity tagging may employ one or more supervised machine learning techniques based on discriminative statistical models, such as Conditional Random Fields (CRFs).

In various embodiments, entity tagging may involve classifying and/or labeling text contained in input with entity types and/or slot types. In various implementations, classifying, labeling, and/or tagging text contained in user input may be based on known or learned lexical and/or contextual relationships between certain entity and/or slot types and particular words or phrases. As an example, text or ngrams that represent certain entity and/or slot types (e.g., movie genre, movie star, etc.) may be known to be in close proximity to certain words (e.g., movie). As another example, text or ngrams that follow certain words or phrases (e.g., starring, movie with) may be known to be likely to represent a certain entity and/or slot type (e.g., movie star).

At 240, a surface form of an entity may be detected within an entity representation. In various embodiments, a surface form, ambiguous entity representation or other type of expression (e.g., a temporal expression, a geographic expression, a numerical expression and/or a natural language expression) that requires normalization may be detected within an entity representation. In some implementations, the entire entity representation may be a surface form of an entity.

A surface form and/or other type of ambiguous expression or value may be detected and/or determined to require normalization in various scenarios. For example, a surface form, expression and/or value may not clearly or completely identify a domain-dependent entity and/or entity attribute, may not uniquely identify or address a domain-dependent entity and/or entity attribute, may not comply with a structure (e.g., address structure, categorization structure, format structure, and the like) utilized by a resource (e.g. application, web service, and/or information source) from which the user desires a response, and/or may otherwise be determined to be ambiguous.

In some embodiments, a surface form of an entity and/or entity attribute may be detected within a slot. For example, slot contents may contain a surface form that represents a domain-dependent entity and/or entity attribute using an ambiguous natural language expression rather than a canonical name. As such, slots containing surface forms of domain-dependent entities and/or entity attributes may be determined to be ambiguous and require normalization.

At 250, a surface form may be mapped to a normalized value. In various embodiments, a surface form of an entity, ambiguous entity representation or other type of expression (e.g., a temporal expression, a geographic expression, a numerical expression and/or a natural language expression) may be resolved, normalized and/or mapped to a normalized value such as a canonical name, canonical form, canonical format, or other type of unique identifier. In various implementations, normalizing entities and/or entity attributes may involve using a set of normalization rules, using one or more lookup tables, using one or more machined learned methods, and/or using an entity normalization index that associates entities with alternate surface forms derived from web corpora. In one or more implementations, entity tags or labels (e.g., entity types, slot types, and the like) may be used as features to perform normalization.

In one or more embodiments, a surface form contained in a slot may be mapped to a normalized value (e.g., canonical name, canonical form canonical format, unique identifier, and the like) of a domain-dependent entity and/or entity attribute. In various implementations, slots and/or slot contents may be mapped to normalized values by performing one or more of: deterministic and/or domain-independent normalization using a set of normalization rules; normalization using one or more lookup tables; normalization using machine learned methods; and/or normalization using an entity normalization index. In one implementation, for example, slots and/or slot contents that require normalization may be passed to an entity normalization index using the slot tags as additional metadata.

In various implementations, slots and/or slot contents that contain natural language expressions and/or other types of surface forms may be mapped to domain-dependent (e.g., domain-relevant, domain-specific, and the like) entities and/or entity attributes. In one example, slots and/or slot contents that represent a surface form (e.g., comedy, comedies, funny, humor, slapstick, etc.) of a movie domain-dependent entity and/or entity attribute (e.g., movie genre) may be identified within the text and mapped to a normalized value (e.g., the canonical name comedy). In another example, slots and/or slot contents that represents a surface form (e.g., schedule, upcoming games, fixtures, and the like) of a sports domain-dependent entity and/or entity attribute (e.g., sports schedule, sports stats, sports standings, and the like) may be identified within text and mapped to the canonical name of a sports-domain dependent entity and/or entity attribute (e.g., sports schedule). In a further example, slots and/or slot contents that represent a surface form of a cost (e.g., cheap, expensive, and the like) may be identified within text and mapped to the canonical name of a restaurant domain-dependent entity and/or entity attribute (e.g., price range).

In one or more implementations, personalized information about a user, query information, entity information, client device 110 and/or computer system 130 parameters, and/or machine learned models may be used for incorporating one or more features into an entity normalization request. In one or more implementations, personalized information about a user, query information, entity information, client device 110 and/or computer system 130 parameters, and/or machine learned models may be used for processing a normalization response, such as a list of normalized values that match natural language text. For example, such information may be used to select a particular normalized value from a ranked list of normalized values. As noted above, language understanding framework 140 may be permitted by a user to access and employ personalized information about the user and/or parameters of client device 110.

At 260, a request may be constructed using the normalized value. In various embodiments, a normalized value may be used to construct a request to a structured knowledge source and/or an application, such as a tasked-based application or intelligent personal assistant. In various implementations, the request may be configured for: interacting with an application and/or structured knowledge source using canonical values supported by the application and/or structured knowledge source; querying a remote resource for information related to the user input; and/or requesting performance of a particular task such as answering a question, playing a media item, scheduling an event, and/or other type of action. In one or more implementations, a constructed request may use a normalized value in place of, instead of, and/or without using the surface form. As such, a constructed request may be configured to yield a result that is scoped to a specific result with respect to a specific normalized entity.

In various implementations, a request may be constructed for and/or communicated to one or more: client program(s) 112 and/or client application(s) 116, computer system program(s) 138 and/or computer system application(s) 144, web service(s) 160 and/or web service application(s) 162, information source(s) 170, and/or other types of local and/or remote resources. For example, a request using a normalized value may be constructed for and/or communicated to one or more local and/or remote resources configured to provide information and/or services related to a particular domain. As noted above, language understanding framework 140 may obtain appropriate permission from a user of client device 110 for allowing language understanding framework 140 to communicate with various local and/or remote resources.

A request using a normalized value may be made to one or more client application(s) 116, such as a task-based client application (e.g., calendar application) for example, to request performance of a particular task (e.g., schedule an event) based on the normalized value. A request using a normalized value may be made to intelligent personal assistant 118 and/or to a dialog application that supports intelligent personal assistant 118, for example, to request performance of a particular task (e.g., answer question) based on the normalized value. A dialog application that supports intelligent personal assistant 118 may be hosted by one or more computer system application(s) 144 and/or web service application(s) 162, for example.

A request using a normalized value may be made to one or more computer system application(s) 144, such as a server-hosted search-enabled application (e.g., entertainment search application) for example, to request performance of a particular task (e.g., search for media item) based on the normalized value. A request using a normalized value may be made to one or more web service application(s) 162, such as a search-enabled third-party web service application (e.g., weather application) for example, to request performance of particular task (e.g., obtain current local weather) based on the normalized value.

A request using a normalized value may be made to one or more information source(s) 170, such as a structured entity catalog (e.g., movie catalog) for example, to request retrieval of a particular entity (e.g., movie item) based on the normalized value. In one or more implementations, a normalized value may be used to construct a request that is amenable to and/or configured for interaction with a structured knowledge source.

In various implementations, language understanding framework 140 may support a particular application (e.g., search-enabled movie application) that employs a structured knowledge source (e.g., movie catalog containing a closed set of movies) and that allows browsing items by category type (e.g., movie genre) using particular predefined category names (e.g., comedy, action, drama, etc.) and/or allows querying for items using words that appear in item names (e.g., movie titles). In such implementations, surface forms contained in user input may be normalized to canonical names for constructing requests that comply with a requirement (e.g., categorization schema, addressing schema, formatting schema, and the like) of the particular application and/or structured knowledge source.

As an example, user input that represents a surface form (e.g., funny, exciting, emotional, etc.) of a particular category (e.g., particular movie genre) may be normalized to a canonical category name (e.g., comedy, action, drama, etc.) which is supported by a structured knowledge source and which can be used to construct a request for browsing items by category type (e.g., movie genre) based on the canonical category name instead of the surface form of the category represented by the user input.

As another example, user input that represents a surface form (e.g., second harry potter, most recent tom cruise action movie, etc.) of a particular item (e.g., particular movie) may be normalized to a canonical item name (e.g., Harry Potter and the Chamber of Secrets, Mission: Impossible Ghost Protocol, etc.) which is supported by a structured knowledge source and which can be used to construct a query based on the canonical item name instead of the surface form of the item represented by the user input.

In various implementations, a normalized value may be used to construct a request that is configured to yield a result that is scoped to an actual result desired by a user. In one implementation, for example, a target of the constructed response may be selected and/or determined by matching an actual result desired by a user to a particular application that is configured to and/or capable of providing an application response that is scoped to the actual result desired by the user. An actual result desired by a user may be determined, for example, based on a detected intent of user input.

In cases where a user is seeking performance of a specific task (e.g., play particular movie), applications that are only able to provide a general or broadly-scoped response (e.g., return a list of hyperlinks relevant to the movie) may be excluded as targets in favor of an application that is configured to provide an application response (e.g., enabling the movie to begin playing and/or playing the particular movie) that is scoped to the actual result requested by the user. In cases where multiple applications are able to deliver the actual intended result (e.g., a scoped application response), an application that can best deliver the result in terms of cost and/or time may be selected as the target of the constructed response.

Exemplary Architecture for Entity and Attribute Resolution

Figure 3:
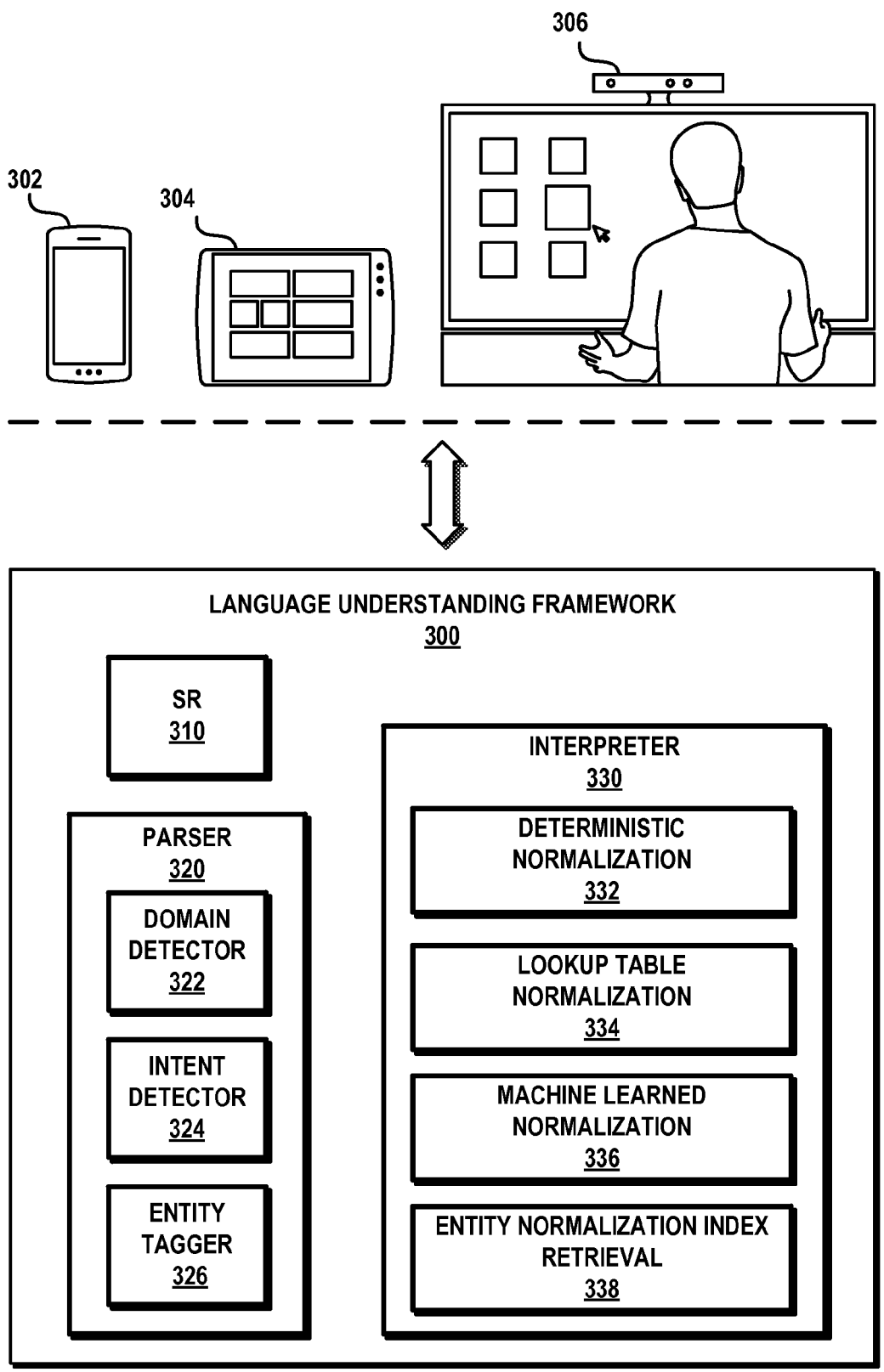
FIG. 3 illustrates an embodiment of an exemplary architecture for performing entity and attribute resolution.

FIG. 3 illustrates a language understanding framework 300 as an embodiment of an exemplary architecture for entity and attribute resolution in accordance with the described subject matter. In one implementation, language understanding framework 300 may be an example of language understanding framework 140. It is to be appreciated that language understanding framework 300, or portions thereof, may be implemented by other components and/or by various computer systems and/or computing devices.

In one embodiment, language understanding framework 300 may be configured to provide language understanding services that support one or more applications and/or interfaces, such as client application(s) 116 and/or interfaces of client device(s) 110, for example. Exemplary client device(s) 110 that are shown in FIG. 3 include: a smartphone 302, a tablet device 304, and a video-game system 306.

As shown, language understanding framework 300 may include a speech recognizer 310, a parser 320, and an interpreter 330. Speech recognizer 310 may be configured to convert an audio representation of verbal user input that is captured by one or more of smartphone 302, tablet device 304, and/or or video-game system 306 into text user input that may be processed by one or more other components of language understanding framework 300.

In one or more embodiments, parser 320 may be configured to receive user input expressed as text and perform various types of lexical processing, syntactic processing, semantic processing, contextual processing, and/or other types of processing to analyze text contained in user input. Parser 320 may be implemented by one or more types of parsers, detectors, classifiers and/or taggers configured to employ one or more types of artificial intelligence and/or machine learning techniques. In one implementation, parser 320 may be configured to detect a domain of user input, detect an intent of user input, tag entity representation(s) contained in user input with entity and/or slot type(s), and/or to perform other types of processing in accordance with the described subject matter.

In one or more embodiments, parser 320 may include a domain detector 322, an intent detector 324, and an entity tagger 326 that may be implemented by various types of parsers, detectors, classifiers and/or taggers configured to employ one or more types of artificial intelligence and/or machine learning techniques. In an exemplary embodiment, domain detector 322, intent detector 324, and/or entity tagger 326 may be implemented by one or more parsers, detectors, classifiers and/or taggers configured to employ one or more supervised machine learning techniques, such as: SVM machine learning techniques, decision tree (e.g., boosted decision tree) machine learning techniques, CRFs machine learning techniques, and the like.

In various embodiments, domain detector 322 may be configured to detect a domain of user input and/or perform other types of domain detection in accordance with the described subject matter. Intent detector 324 may be configured to detect an intent of user input and/or perform other types of intent detection in accordance with the described subject matter. Entity tagger 326 may be configured to tag entity representation(s) contained in user input with entity and/or slot type(s) and/or to perform other types of entity tagging in accordance with the described subject matter. In various implementations, domain detector 322, intent detector 324, and/or entity tagger 326 may be trained and/or refined based on data collected from: ongoing interactions and/or observations in the domain and/or in similar domains, data collected from one or more information source(s) 170 (e.g., knowledge graphs, web logs, and/or web corpora), and/or data collected from an entity normalization index.

In one implementation, interpreter 330 may be configured to: detect surface forms of entities and/or entity attributes; map surface forms of entities and/or entity attributes to normalized values; and/or perform other types of processing to resolve ambiguous representations of entities and/or entity attributes. In one or more embodiments, interpreter 330 may be implemented by various normalization rules and trained models that are configure to produce normalization.

In one example embodiment, interpreter 330 may be configured to resolve a surface form and/or other type of ambiguous representation of an entity by performing one or more types of entity normalization implemented by one or more of: a deterministic normalization component 332 configured to perform deterministic and/or domain-independent normalization using set of normalization rules; a lookup table normalization component 334 configured to perform normalization using one or more lookup tables; a machine learned normalization component 336 configured to perform normalization using one or more machine learned methods; and an entity normalization index retrieval component 338 configured to perform normalization using an entity normalization index.

The following tables show examples to further illustrate aspects the described subject matter. It is to be understood that the examples are illustrative only and that various types of entity normalization may be performed for various types of entities and/or entity attributes. Furthermore, the examples are not intended to limit the described subject matter to particular data types and/or data structures.

The examples shown in the tables may be representative of various types of user input that may be processed by one or more components of language understanding framework 300. In some implementations, the user input may contain text that corresponds to verbal user input that was captured by one or more of: smartphone 302, tablet device 304, and/or or video-game system 306.

The examples shown in the tables also may be representative of various types of output from one or more of: parser 320, domain detector 322, intent detector 324, and/or entity tagger 326. In some embodiments, for example: domain corresponds to a domain detected by domain detector 322, intent corresponds to an intent detected by intent detector 324, and the text corresponds to text tagged by entity tagger 326. In various implementations, tagged text (e.g., entity representations) that require normalization may be provided to interpreter 330 for mapping and/or resolution using one or more of: deterministic normalization component 332, lookup table normalization component 334, machine learned normalization component 336, and/or normalization index retrieval component 338.

Table 1 (below) shows an example in which the surface form "most recent" is tagged with an entity type "ReleaseDate." In this example, normalization may involve mapping the temporal expression "recent" to a normalized date range value with respect to a current time reference and/or query session related time reference; and normalized results may include a listing of movies that includes the canonical name "Mission: Impossible Ghost Protocol" and a relevance score.

TABLE 1

| User input: | find the most recent action tom cruise movies |
|---|---|
| Domain: | Movie |
| Intent: | find_movie |
| ReleaseDate: | most recent |
| MovieStar: | tom cruise |
| MovieGenre | action |

Table 2 (below) shows an example in which features from a previous query are used to supplement features of a current query. In this example, domain, intent, and genre for a current query may be supplied based on prior classification and tagging performed for the previous query shown in Table 1 and may be used to map to the canonical name "Mission: Impossible Ghost Protocol" in the movie domain.

TABLE 2

| User input: | the one with jeremy renner |
|---|---|
| Domain: | movie |
| Intent: | find_movie |
| ReleaseDate: | most recent |
| MovieStar: | jeremy renner |
| MovieGenre | action |

Table 3 (below) shows an example in which the surface form "second harry potter" is tagged with an entity type "MovieTitle." In this example, normalization may involve using a mapping table that correlates the surface form "second harry potter" with the canonical name "Harry Potter and the Chamber of Secrets" in the context of the movie domain.

TABLE 3

| | |
|---|---|
| User input: | find the second harry potter movie |
| Domain: | movie |
| Intent: | find_movie |
| MovieTitle: | second harry potter |
| MovieCharacter: | harry potter |

Table 4 (below) shows an example in which the surface form "indiana jones with sean connery" is tagged with an entity type "MovieTitle." In this example, normalization to the canonical name "Indiana Jones and the Last Crusade" may involve using an entity normalization index that is structured as a set of entities extracted from a movie catalog in association with features derived from related web queries discovered through data mining of a web search log.

TABLE 4

| | |
|---|---|
| User input: | find indiana jones with sean connery |
| Domain: | movie |
| Intent: | find_movie |
| MovieCharacter: | indiana jones |
| MovieTitle: | indiana jones with sean connery |
| MovieStar: | sean connery |

Table 5 (below) shows an example in which the surface form "breakfast" is tagged with an entity type "MeetingTime." Additionally, the surface form "8" is tagged with an entity type "MeetingStartTime." In this example, the surface form "breakfast" may map to the normalized value "morning" using one or more machine learned methods. The normalized value "morning" may then be used to enable the surface form "8" to map to the normalized value "8:00 AM" in a canonical machine-readable format.

TABLE 5

| | |
|---|---|
| User input: | set up a breakfast meeting at starbucks tomorrow from 8 to 9 |
| Domain: | Calendar |
| Intent: | schedule_meeting |
| MeetingTime: | Breakfast |
| MeetingPlace: | starbucks |
| MeetingDate: | tomorrow |
| MeetingStartTime: | 8 |
| MeetingEndTime: | 9 |
| MeetingDuration: | From 8 to 9 |

Exemplary Process for Building an Entity Normalization Index

Figure 4:
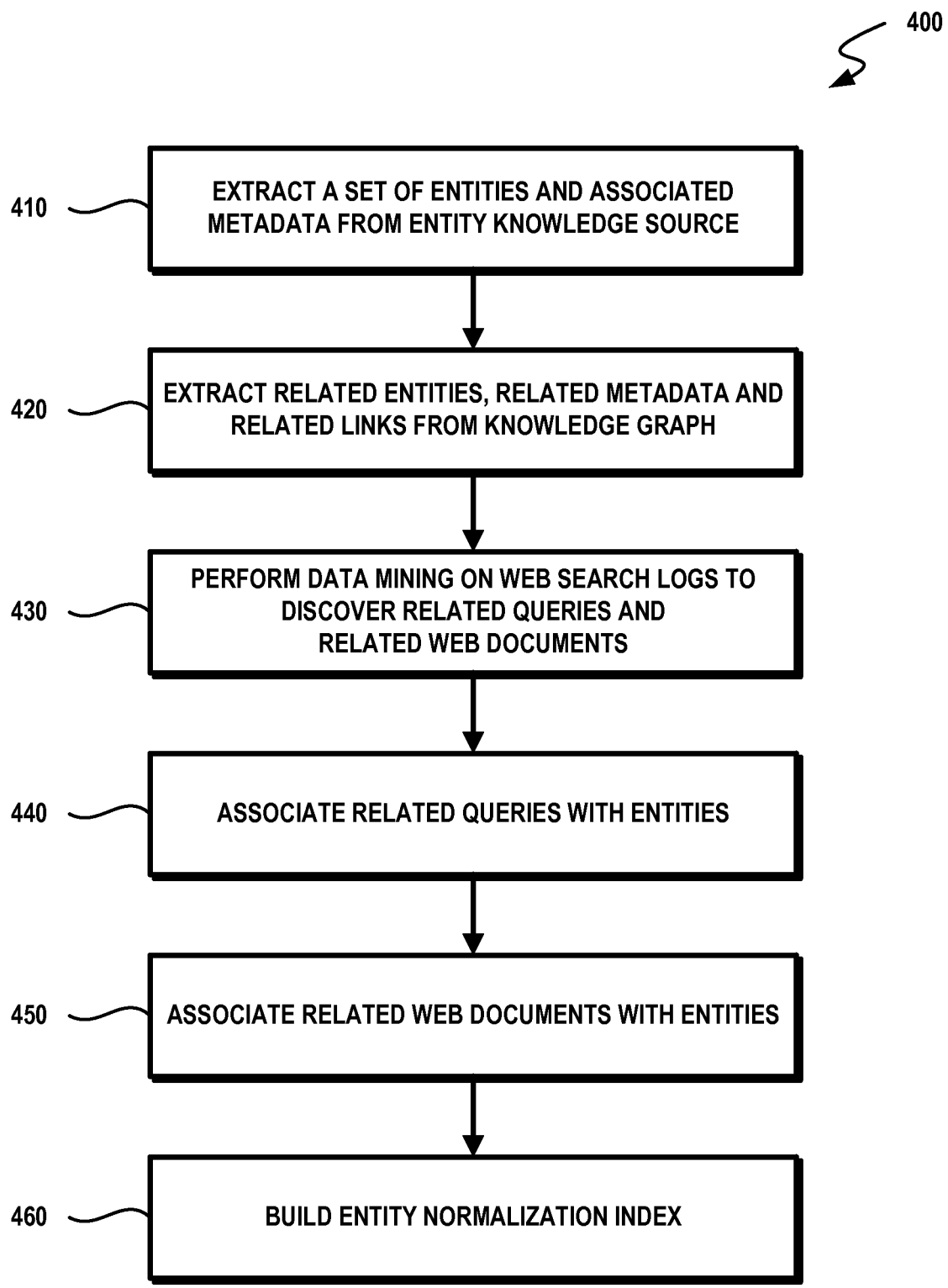
FIG. 4 illustrates an embodiment of an exemplary process for building an entity normalization index.

FIG. 4 illustrates a computer-implemented method 400 as an embodiment of an exemplary process for building an entity normalization index in accordance with aspects of the described subject matter. In various implementations, computer-implemented method 400 may be performed by language understanding framework 140 to create and/or update an entity normalization index. It is to be appreciated that computer-implemented method 400, or portions thereof, may be performed by other components and may be implemented by software, hardware, or a combination thereof in in various embodiments.

At 410, a set of entities and associated metadata may be extracted from an entity knowledge source. For example, an entity knowledge source (e.g., entity knowledge base, entity catalog, entity corpus, entity repository, entity database, entity data set, and the like) may be accessed to extract a set of entities together with associated metadata. In various implementations, associated metadata may contain information such as: descriptors, property types (e.g., actor, director, musician, etc.), user preferences, consumption statistics (e.g., counts of user selections of items related to the entity), URLs linking to additional information, and/or other types of information. In one or more implementations, associated metadata that is related to an extracted set of entities may be preserved and/or used by an entity normalization index to indicate strength of associations, entity popularity, and the like.

At 420, related entities, related metadata and related links may be extracted from a knowledge graph. For example, a knowledge graph (e.g., Microsoft® Satori, Google® Knowledge Graph, Facebook® Open Graph, Freebase, an entity graph, and the like) may be accessed to extract various types of information that is relevant to an extracted set of entities. Information extracted from a knowledge graph may include, for example, related entities (e.g., directly related entities, entities indirectly related within a threshold degree of separation, and the like) that are relevant to an extracted set of entities. Information extracted from a knowledge graph may include, for example, related metadata (e.g., descriptors, property types, user preferences, consumption statistics, clicks, impressions, frequency counts, and the like) that is relevant to an extracted set of entities. Information extracted from a knowledge graph may include, for example, related links (e.g., URLs, related URLs, authoritative URLs, and the like) that are relevant to an extracted set of entities.

At 430, data mining may be performed on one or more web search logs to discover related queries and related web documents. For example, one or more web search logs (e.g., query logs, hyperlink logs, click-through logs, query-click logs, hyperlink graphs, query-click graphs, and the like) may be accessed to discover information that is relevant to an extracted set of entities. In the interest of user privacy, web search engines may obtain appropriate permission from users for allowing web search logs to be generated and mined.

In various implementations, one or more data mining techniques (e.g., graph traversal, graph walking, query recommendation, and the like) may be performed on a web search log to discover related queries (e.g., user queries, web search queries, web service queries, knowledge base queries, catalog queries, repository queries, database queries, recommended queries, and the like) that are relevant to an extracted set of entities and/or to discover related web documents (e.g., authoritative web documents, related SERPs, related SERP summaries, and the like) that are relevant to an extracted set of entities.

In one or more embodiments, past search queries and click data included in a web search log may be mined to discover related queries and/or related web documents that are relevant to an extracted set of entities. Related queries may in turn be used to discover further related queries (e.g., recommended queries, and the like) and/or further web documents (e.g., SERPs, SERP summaries, and the like).

In one or more embodiments, a query-click graph (e.g., a bipartite query-URL graph, a weighted bipartite query-URL graph, and the like) may be mined to discover one or more of: related queries associated with a seed link, related documents associated with a seed link, related queries associated with a seed query, and/or related documents associated with a seed query. For example, links extracted from a knowledge source, links obtained from a knowledge graph, and/or links associated with click data in a web search log may be used as seed links, and the click-graph may be mined to discover related queries and/or related web documents that are relevant to an extracted set of entities. As another example, entities extracted from a knowledge source and/or related queries discovered from a web log may be used as seed queries, and the click-graph may be mined to discover related queries and/or related documents that are relevant to an extracted set of entities.

In one or more implementations, related scores (e.g., clicks, impressions, query recommendation scores and the like) may be preserved and/or used by an entity normalization index as different signals for the strength of association between queries and entities.

At 440, related queries may be associated with entities. For example, a related query (e.g., user query, web search query, web service query, knowledge base query, catalog query, repository query, database query, recommended query, and the like) that is relevant to an entity included in an extracted set of entities may be associated with such extracted entity within an entity normalization index. In various implementations, related queries that are relevant to an extracted entity (e.g., an extracted catalog entity) may include query terms which represent: aliases, pseudonyms, variants, synonyms, related entities, paraphrases, incomplete specification, incomplete values, misspelling, and the like and which can be associated as alternate surface forms of the entity within an entity normalization index.

At 450, related web documents may be associated with entities. For example, a related web document (e.g., an authoritative web document such as a Wikipedia® page, a related SERP, a related SERP summary, and the like) that is relevant to an entity included in an extracted set of entities may be associated with such extracted entity within an entity normalization index. In various implementations, related web documents that are relevant to an extracted entity (e.g., an extracted catalog entity) may contain references, links, surrounding words, and the like which can be used by an entity normalization index as features for retrieving the entity. For example, a SERP summary that is generated in response to a related query may provide text association that is query dependent; an authoritative web document (e.g., Wikipedia® page) may contain a link represented by anchor text; and/or text that surrounds mentions or references to entities within a web document may provide context. Such associated text, anchor text, and/or surrounding text may be considered related text that is relevant to an extract entity (e.g., an extracted catalog entity).

At 460, an entity normalization index may be built. For example, various types of related data that was extracted and/or derived from multiple sources of information may be used to build an entity normalization index containing entities and their associated features. In one or more implementations, an entity normalization index may include the entities of the extracted set of entities in association with various types of features such as: words, phrases, term frequency inverse document frequency (tf/idf) weights, ranking model parameters, and the like. In one or more embodiments, an entity normalization index of entities and their associated features may be created by using data that is associated with entities as features either directly or through one or more types of processing such as: lexical processing, syntactic processing, semantic processing, contextual processing, and the like.

Exemplary Architecture for Building an Entity Normalization Index

Figure 5:
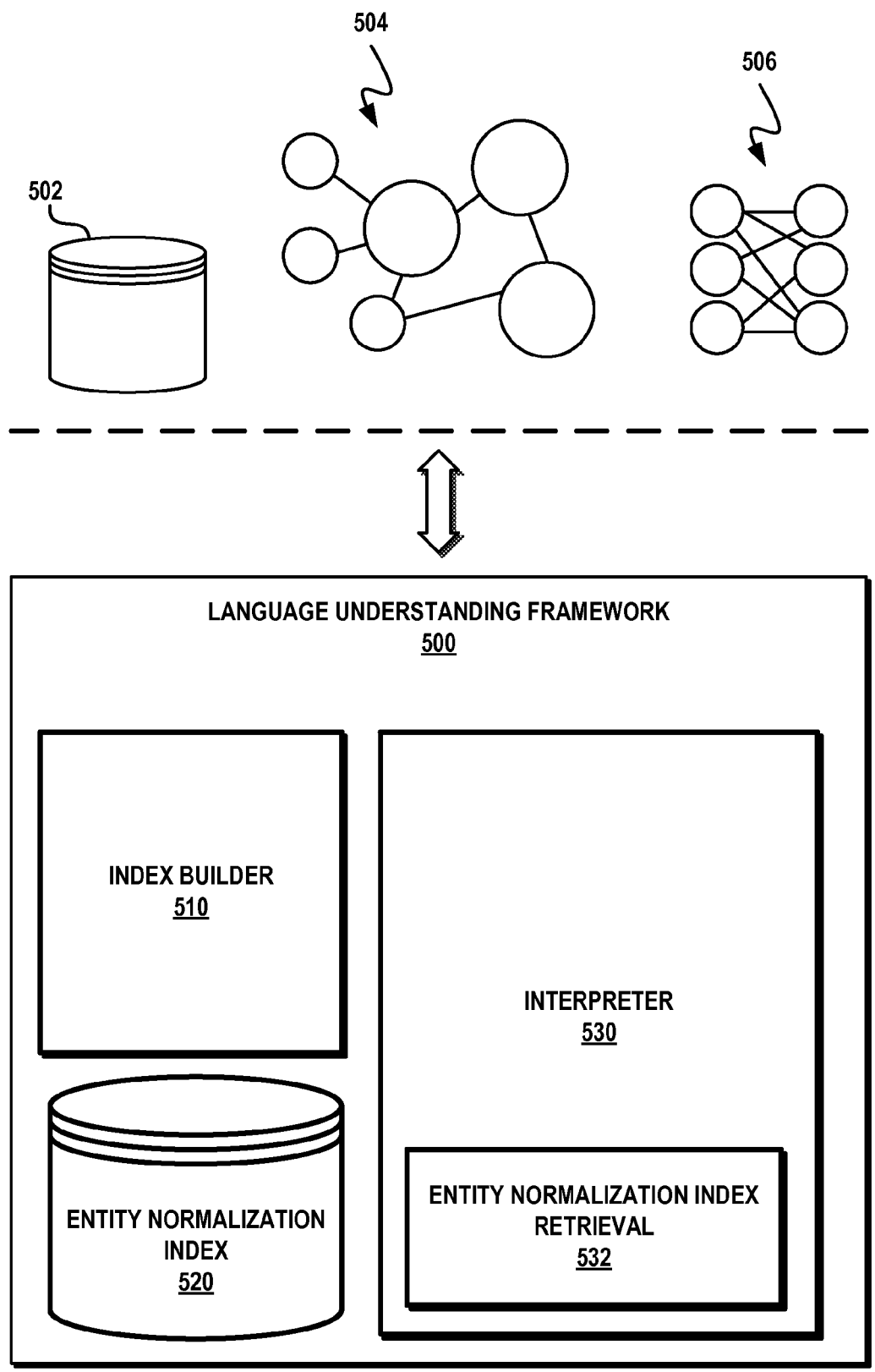
FIG. 5 illustrates an embodiment of an exemplary architecture for implementing an entity normalization index.

FIG. 5 illustrates a language understanding framework 500 as an embodiment of an exemplary architecture for building an entity normalization index in accordance with the described subject matter. In one implementation, language understanding framework 500 may be an example of language understanding framework 140. It is to be appreciated that language understanding framework 500, or portions thereof, may be implemented by other components and/or by various computer systems and/or computing devices.

In various embodiments, language understanding framework 500 may be configured to access one or more information source(s) 170. Exemplary information source(s) 170 that are shown in FIG. 5 include: an entity catalog 502, a knowledge graph 504, and a web search log 506.

As shown, language understanding framework 500 may include an index builder 510, an entity normalization index 520, and an interpreter 530. In various implementations, index builder 510 may be configured to create and/or update entity normalization index 520. In one or more implementations, index builder 510 may be configured to: extract catalog entities and associated metadata may from entity catalog 502; extract related entities, related metadata and related links that are relevant to catalog entities from knowledge graph 504; and/or perform data mining on web search log 506 to discover related queries and related web documents that are relevant to catalog entities. In one or more implementations, index builder 510 may be configured to associate related queries with catalog entities; associate related web documents with catalog entities; and/or build entity normalization index 520. In one or more implementations, entity normalization index 520 may preserve and/or use associated metadata that is related to an extracted set of entities to indicate strength of associations, entity popularity, and the like.

In an example embodiment, entity normalization index 520 may be built as an index of entities and their associated features. Examples of features that may be associated with entities within entity normalization index 520 may include: ngrams (e.g., words, letters, syllables, phonemes, and the like), lexical features (e.g., unigrams, bigrams, variants, surface forms, and the like), semantic features (e.g., categories, properties, related entities, related queries, and the like), contextual features (e.g., surrounding words, related text, related references, related links, use cases, and the like), latent features (e.g., implicit entity information, inferred entity relationships, and the like), personalized features (e.g., user preferences, user demographics, popularity, and the like), metadata features (e.g., association strength, query popularity, entity popularity, descriptors, and the like), and/or other types of information.

Table 6 (below) shows an embodiment of an exemplary index structure that may be utilized by entity normalization index 520. It is to be understood that the exemplary index structure is illustrative only and is not intended to limit the described subject matter to particular data types and/or data structures.

TABLE 6

| Entity | Features |
| --- | --- |
| e1 | f[11], f[12], . . . , f[1K] |
| e2 | f[21], f[22], . . . , f[2K] |
| . . . | . . . |

In various embodiments, interpreter 530 may be configured to: detect surface forms of entities and/or entity attributes; map surface forms of entities and/or entity attributes to normalized values; and/or perform other types of processing to resolve ambiguous representations of entities and/or entity attributes. In one or more embodiments, interpreter 530 may be implemented by various normalization rules and trained models that are configured to produce normalization. In one example embodiment, interpreter 530 may implement an entity normalization index retrieval component 532 configured to perform normalization using entity normalization index 520.

In some embodiments, normalization using entity normalization index 520 may be framed and/or solved as a document retrieval problem where: each of the catalog entities is associated with sets of related queries, related web documents and related metadata; and an input query (or sub-phrases) is used to retrieve a catalog entry as the most relevant match to its associated data. For instance, in one example embodiment:

1. Each entity $e_i$ is presented as a vector: $e_i \rightarrow$ [ngrams: value, lexical_features: value, semantic_features:value, METADATA:value];
2. Each input query $q_j$ is represented as a vector: $q_j \rightarrow$ [ngrams:value, lexical_features:value, semantic_features: value, METADATA:value]; and
3. The inner product $<e_i, q_j>$ represents the goodness of linking the input text $q_j$ to the entity $e_i$.

In the foregoing example embodiment, the values associated with each feature may denote the importance of the feature in the representation. Discovery of salient features and good feature values become key learning problems in order to produce good retrieval and ranking results.

In various implementations, user input received by language understanding framework 500 may be processed to extract one or more types of features that correspond to types of features associated with entities within entity normalization index 520. In one or more embodiments, entity normalization index retrieval component 532 may use features extracted from user input to retrieve a canonical entity or ranked list of canonical entities from entity normalization index 520. The canonical entity retrieved from entity normalization index 520 may represent the normalized entity that best matches text contained in user input. The ranked list of canonical entities retrieved from entity normalization index 520 may represent normalized entities that are most relevant to text contained in user input.

One example of normalization using entity normalization index 520 is illustrated by Table 7, below. It is to be understood that this example is illustrative only and is not intended to limit the described subject matter to particular data types and/or data structures.

TABLE 7

| User Input | Index Structure | | Result |
|---|---|---|---|
| q < fq1, fq2, ... , fqk> | Entity | Features | e1, score1 |
| | e1 | f[11], f[12], ... , f[1K] | e2, score2 |
| | e2 | f[21], f[22], ... , f[2K] | |
| | ... | ... | |

In this example, a user input sub-phrase that represents a surface form of a catalog entity is processed to extract features that correspond to types of features associated with entities within entity normalization index 520 and that are then used to retrieve related entities from entity normalization index 520. In this example, the resulting ranked list of entities represents the most relevant normalized entities to the input text along with associated relevance scores.

Exemplary Process for Rendering a Response Based on a Normalized Entity Value

Figure 6:
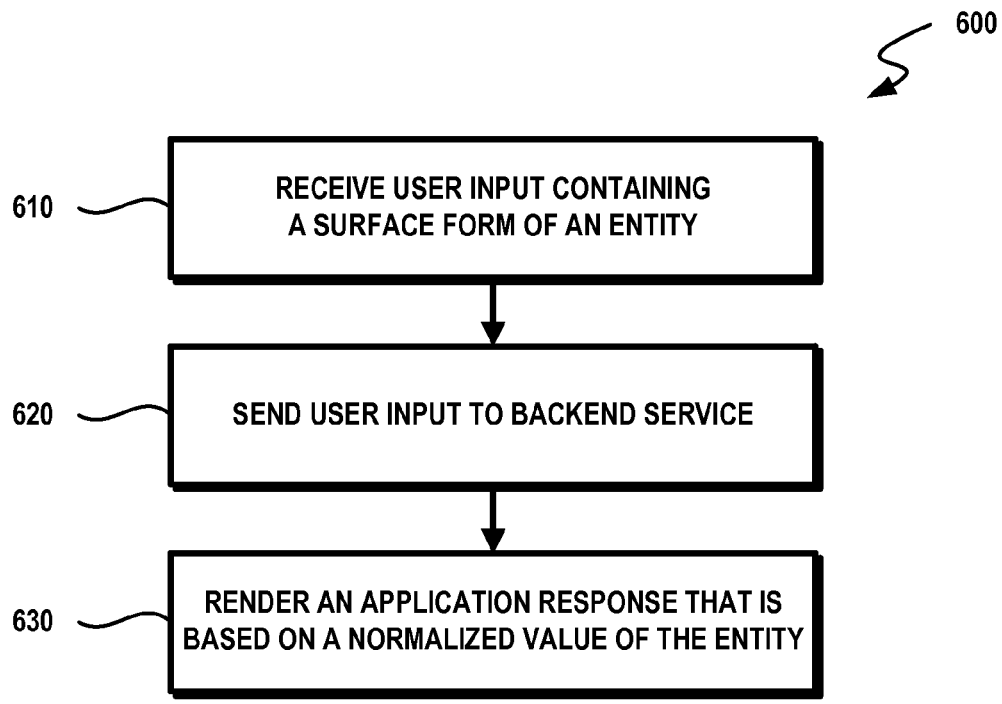
FIG. 6 illustrates an embodiment of an exemplary process for rendering a response based on a normalized value.

FIG. 6 illustrates a computer-implemented method 600 as an embodiment of an exemplary process for rendering a response based on a normalized value in accordance with aspects of the described subject matter. In one implementation, computer-implemented method 600 may be performed by client device 110. It is to be appreciated that computer-implemented method 600, or portions thereof, may be performed by various components, computer systems and/or computing devices and may be implemented by software, hardware, firmware or a combination thereof in various embodiments.

At 610, user input containing a surface form of an entity may be received. For example, verbal user input may be captured by client device 110. In various implementations, the verbal user input may be directed to intelligent personal assistant 118 and may request intelligent personal assistant 118 to perform a particular task (e.g., play a movie). In one implementation, an object of the particular task is an entity (e.g., a particular movie), and the verbal user input represents such entity using a surface form (e.g., an alias, a pseudonym, a variant, a synonym, a related entity, a paraphrase, an incomplete specification, an incomplete value, a mispronunciation, and the like) rather than a normalized value (e.g., a canonical name that uniquely identifies the particular movie in a movie catalog).

At 620, user input may be sent to a backend service. For example, an audio representation of verbal user input captured by client device 110 may be sent over network 120 to computer system 130. In response, computer system 130 may perform speech recognition to convert the audio representation into user input expressed as text and may perform normalization of the surface form of the entity represented by the text to obtain a normalized value. Computer system 130 may then use the obtained normalized value (e.g., the canonical name of the particular movie) to construct a request to an application that is configured to perform the particular task. In various implementations, a constructed request that includes a normalized value may be communicated to one or more of: client application(s) 116 (e.g., a movie service application), intelligent personal assistant 118, computer system application(s) 144 (e.g., a server-hosted movie service application), and web service application(s) 162 (e.g., a third-party web-based movie service application).

At 630, an application response that is based on a normalized value of the entity may be rendered. For example, client device 110 may render a response from one or more of: client application(s) 116 (e.g., a movie service application), intelligent personal assistant 118, computer system application(s) 144 (e.g., a server-hosted movie service application), and web service application(s) 162 (e.g., a third-party web-based movie service application). In one or more implementations, the application response (e.g., enabling the movie to begin playing and/or playing the particular movie) is scoped to an actual result desired by a user (e.g., playing the particular movie).

Exemplary Response Based on a Normalized Value

Figure 7:
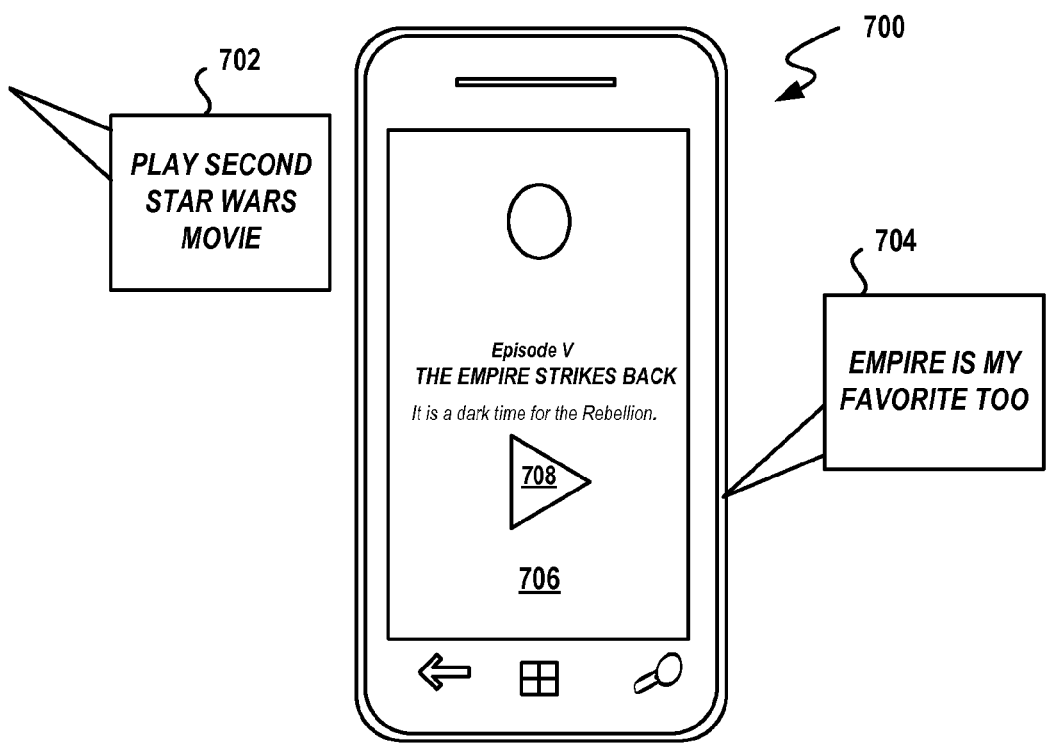
FIG. 7 illustrates an embodiment of an exemplary response based on a normalized value.

FIG. 7 illustrates a mobile computing device 700 that may be configured to provide an embodiment of an exemplary response based on a normalized value in accordance with aspects of the described subject matter. In one implementation, mobile computing device 700 may be an example of client device 110.

As shown, mobile computing device 700 may be configured to receive verbal user input 702 containing a surface form of an entity and to render an application response based on a normalized value of the entity. In an example embodiment, the application response may be provided by a conversational application (e.g., intelligent personal assistant 118 and the like) and may include a computer-generated voice response 704 that outputs at least a portion of the normalized value (e.g., canonical name) of the entity. In some implementations, the computer-generated voice response 704 may acknowledge that verbal user input 702 has been received and/or understood by the conversational application.

The application response may include a visual representation of entity content within a user interface 706. In some implementations, a brief preview of entity content may be rendered and then paused to allow a user of mobile computing device 700 to continue rendering entity content. For example, a selectable icon 708 may be presented in user interface 706 for allowing the user to resume playback of entity content (e.g., content of a particular movie) that is paused after a brief preview.

Various types of processing may be performed on verbal user input 702 in order to render the application response. For example, an audio representation of verbal user input 702 captured by mobile computing device 700 may be sent over network 120 to a backend service (e.g., computer system 130 and the like). In response, the backend service may perform speech recognition to convert the audio representation into user input expressed as text and may perform normalization of the surface form of the entity represented by the text to obtain a normalized value.

Normalization performed by a backend service may include, for example, using a domain-dependent lookup table and/or a domain-dependent entity normalization index that is structured as a set of entities (e.g., a closed set of entities extracted from a movie catalog) in association with alternate surface forms derived from related web queries discovered through data mining of a web search log.

In addition, a ranked and/or scored list of normalized values (e.g., The Empire Strikes Back and Star Wars Episode II: Attack of the Clones) may be determined and/or may be output to a user in some cases. Further, a particular normalized value (e.g., The Empire Strikes Back) may be automatically selected from the ranked and/or scored list of normalized values based on user information, query popularity, entity popularity, and the like. In the interest of user privacy, the backend service may obtain appropriate permission from a user of mobile computing device 700 for allowing the backend service to access and employ such user information.

Additionally, a request may be constructed using a normalized value (e.g., canonical name) of the best matching entity value and then communicated to a particular target application that is selected from multiple candidate applications (e.g., movie service application and television service application that both offer on-demand access to the movie) in order to provide an application response that is scoped to the actual result desired by the user. In some cases, the conversational application and the particular target application may cooperate to cause the appropriate rendering of an application response. For example, user interface 706 may display a user interface of the target application. It is to be understood that the foregoing description of a response based on a normalized value and the backend processing to provide such response is illustrative and non-limiting.

Exemplary Mobile Computing Device

Figure 8:
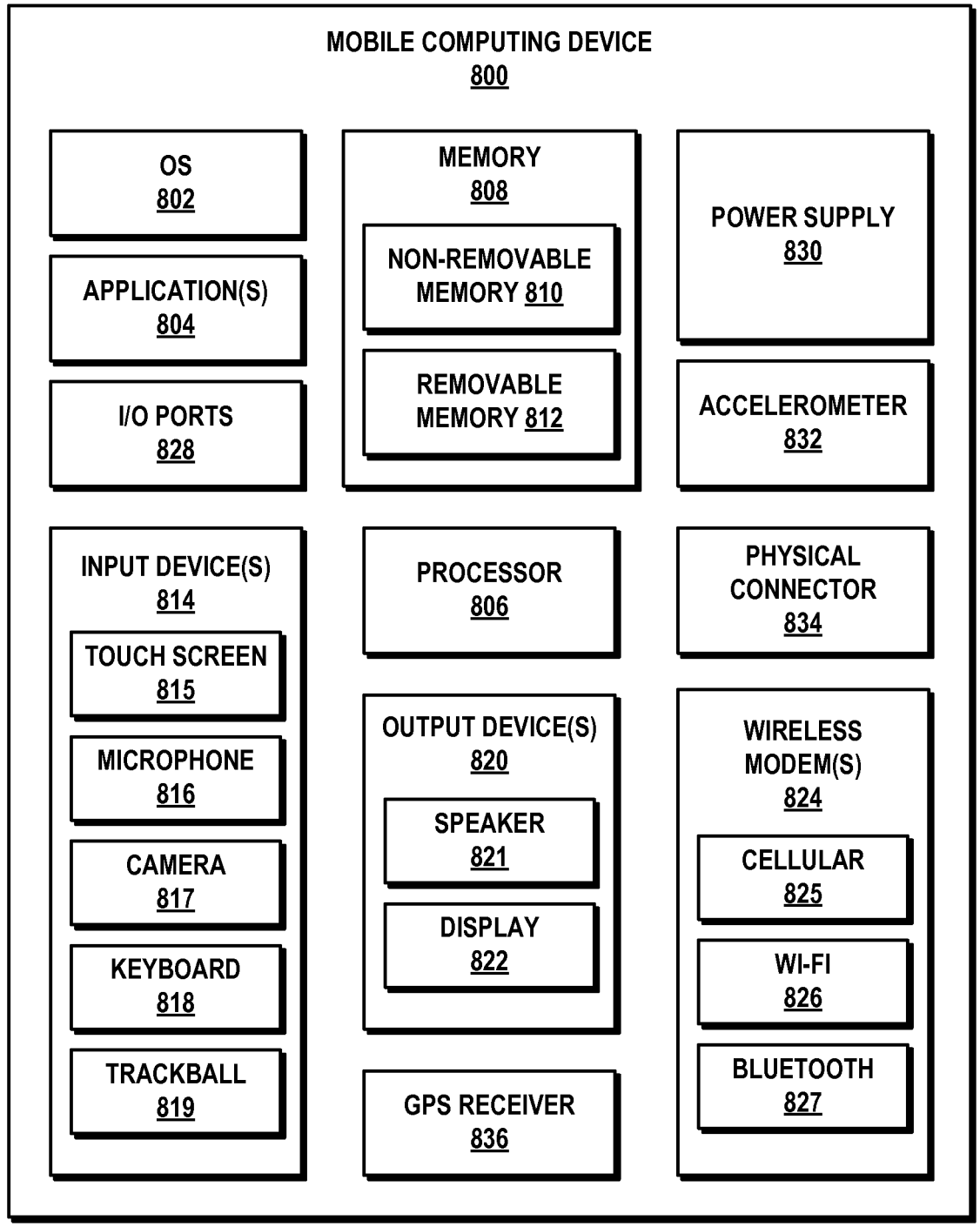
FIG. 8 illustrates an embodiment of an exemplary mobile computing device that may implement aspects of the described subject matter.

FIG. 8 illustrates a mobile computing device 800 as an embodiment of an exemplary mobile computing device that may implement aspects of the described subject matter. In one implementation, mobile computing device 800 may be an example of client device 110.

As shown, mobile computing device 800 includes a variety of hardware and software components that may communicate with each other. Mobile computing device 800 may represent any of the various types of mobile computing device described herein and can allow wireless two-way communication over a network (e.g., network 120 and the like), such as one or more mobile communications networks (e.g., cellular and/or satellite network), a LAN, and/or a WAN.

Mobile computing device 800 can include an operating system 802 (e.g., operating system 114 or other type of operating system) and various types of mobile application(s) 804. In some implementations, mobile application(s) 804 may include one or more of client application(s) 116 (e.g., intelligent personal assistant 118, a search-enable application and/or other types of client applications) and/or may include one or more components of language understanding framework 140.

Mobile computing device 800 can include a processor 806 (e.g., signal processor, microprocessor, ASIC, or other control and processing logic circuitry) for performing tasks such as: signal coding, data processing, input/output processing, power control, and/or other functions.

Mobile computing device 800 can include memory 808 implemented as non-removable memory 810 and/or removable memory 812. Non-removable memory 810 can include RAM, ROM, flash memory, a hard disk, or other memory device. Removable memory 812 can include flash memory, a Subscriber Identity Module (SIM) card, a "smart card" and/or other memory device.

Memory 808 can be used for storing data and/or code for running operating system 802 and/or mobile application(s) 804. Example data can include web pages, text, images, sound files, video data, or other data to be sent to and/or received from one or more network servers or other devices via one or more wired and/or wireless networks. Memory 808 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile computing device 800 can include and/or support one or more input device(s) 814, such as a touch screen 815, a microphone 816, a camera 817, a keyboard 818, a trackball 819, and other types of input devices (e.g., a Natural User Interface (NUI) device and the like). Touch screen 815 may be implemented, for example, using a capacitive touch screen and/or optical sensors to detect touch input. Mobile computing device 800 can include and/or support one or more output device(s) 820, such as a speaker 821, a display 822, and/or other types of output devices (e.g., piezoelectric or other haptic output devices). In some implementations, touch screen 815 and display 822 can be combined in a single input/output device.

Mobile computing device 800 can include wireless modem(s) 824 that can be coupled to antenna(s) (not shown) and can support two-way communications between processor 806 and external devices. Wireless modem(s) 824 can include a cellular modem 825 for communicating with a mobile communication network and/or other radio-based modems (e.g., Wi-Fi 826 and/or Bluetooth 827). Typically, at least one of wireless modem(s) 824 is configured for: communication with one or more cellular networks, such as a GSM network for data and voice communications within a single cellular network; communication between cellular networks; or communication between mobile computing device 800 and a public switched telephone network (PSTN).

Mobile computing device 800 can further include at least one input/output port 828, a power supply 830, an accelerometer 832, a physical connector 834 (e.g., a USB port, IEEE 1394 (FireWire) port, RS-232 port, and the like), and/or a Global Positioning System (GPS) receiver 836 or other type of a satellite navigation system receiver. It can be appreciated the illustrated components of mobile computing device 800 are not required or all-inclusive, as various components can be omitted and other components can be included in various embodiments.

In various implementations, components of mobile computing device 800 may be configured to perform various operations described in connection with client device 110, client application(s) 116, intelligent personal assistant 118, and/or other computing devices and/or applications. In one example embodiment, computer-readable instructions for performing such operations may be stored in a computer-readable storage medium, such as memory 808 for instance, and may be executed by processor 806.

Exemplary Video-Game System

Figure 9:
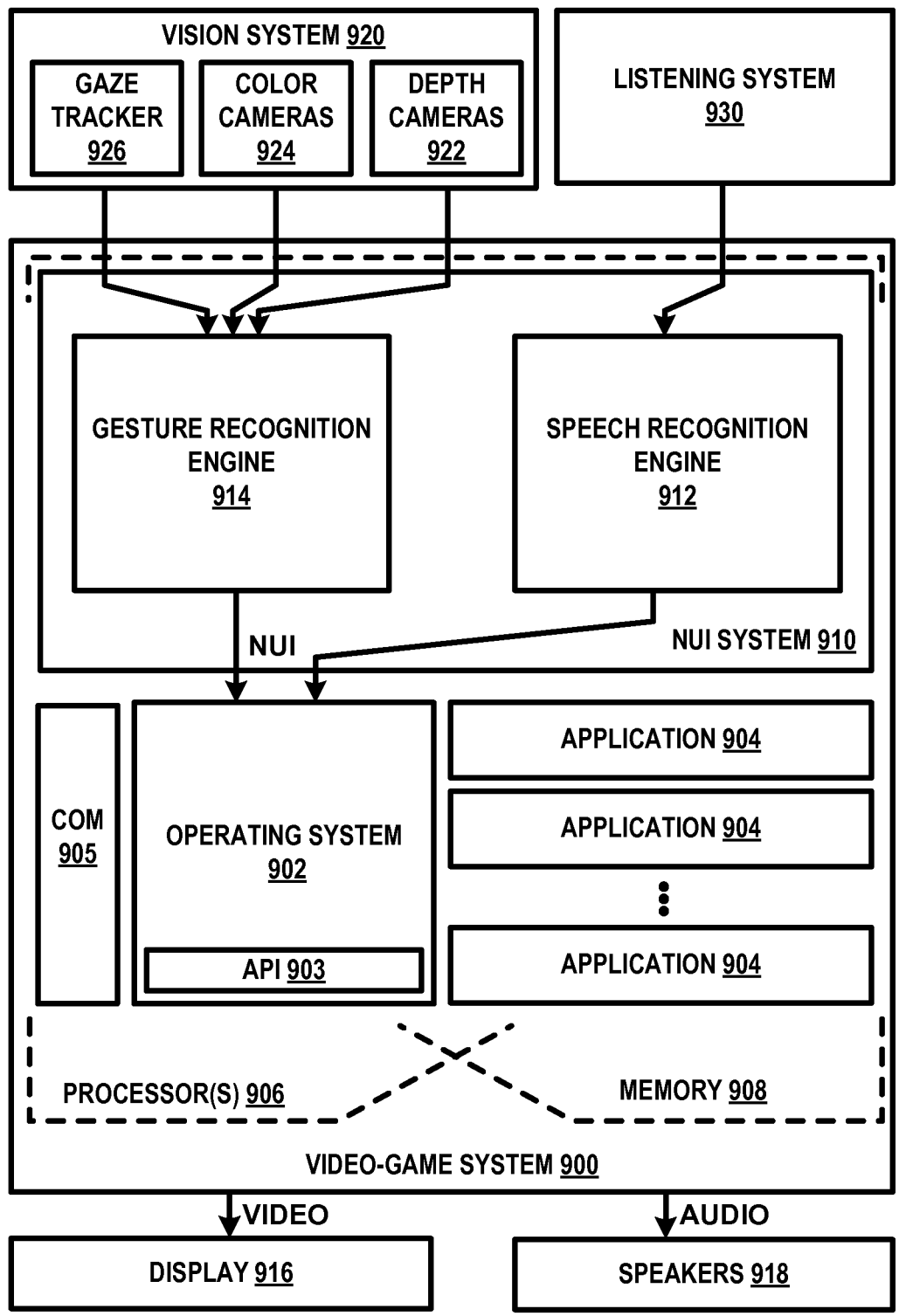
FIG. 9 illustrates an embodiment of an exemplary video-game system that may implement aspects of the described subject matter.

FIG. 9 illustrates a video-game system 900 as an embodiment of an exemplary video-game system that may implement aspects of the described subject matter. In one implementation, video-game system 900 may be an example of client device 110.

In some embodiments, video-game system 900 may be implemented as a combined multimedia and video-game system configured for searching, browsing, and playing various types of content including video-games, movies, and music.

Video-game system 900 includes operating system 902 (e.g., operating system 114 or other type of operating system) and various types of video-game system applications 904. In some implementations, video-game system application(s) 904 may include one or more of client application(s) 116 (e.g., intelligent personal assistant 118, a video-game application, a search-enable application and/or other types of client applications) and/or may include one or more components of language understanding framework 140.

Video-game system 900 includes one or more physical devices configured to execute instructions, such as one or more processor(s) 906 configured to execute computer-readable instructions. Processor(s) 906 may be single-core or multi-core, and the instructions executed thereon may be configured for sequential, parallel and/or distributed processing.

Video-game system 900 includes one or more physical device configured to store instructions, such memory 908 implemented by computer-readable storage media. Memory 908 may include removable and/or built-in devices; optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Memory may include volatile, nonvolatile, dynamic, static, read/write, read-only, random-access, sequential-access, location-addressable, file-addressable, and/or content-addressable devices.

Aspects of processor(s) 906 and memory 908 may be integrated together into one or more hardware-logic components. Such hardware-logic components may include FPGAs, PASIC/ASICs, PSSP/ASSPs, a SoC, and CPLDs, for example.

Video-game system 900 may be configured to accept user input through various user-input devices (e.g., keyboard, mouse, touch-screen, gamepad, game controller, and the like). Video-game system 900 is also configured to accept natural user input (NUI) from one or more users and may include a NUI system 910 configured to mediate NUI from the one or more users.

NUI system 910 is configured to capture various aspects of NUI and provide corresponding actionable input to components of video-game system 900. NUI system may receive low-level input from peripheral sensory components such as vision system 920 and listening system 930. Vision system 920 detects visual input from the users and may include one or more depth cameras 922, one or more color cameras 924, and/or a gaze tracker 926. Listening system 930 may include one or more microphones to pick up vocalization and other audible input from one or more users and other sources in an environment. In various implementations, vision system 920 and listening system 930 may share a common enclosure; may be separate components, may be integrated within video-game system 900, and/or may be coupled to video-game system 900.

Depth cameras 922 may include an imaging system configured to acquire a time-resolved sequence of depth maps of one or more human subjects that it sights. Operationally, depth cameras 922 may be configured to acquire two-dimensional image data from which a depth map is obtained via downstream processing. Depth cameras 922 are able to resolve a contour of a human subject even if that subject is moving, and even if the motion of the subject (or any part of the subject) is parallel to the optical axis of the camera. This ability is supported, amplified, and extended through the dedicated logic architecture of NUI system 910.

Color cameras 924 may image visible light from the observed scene in a plurality of channels (e.g., red, green, blue, etc.) by mapping the imaged light to an array of pixels. Alternatively, a monochromatic camera may be included, which images the light in grayscale. Color or brightness values for all of the pixels exposed in the camera constitute collectively a digital color image. Color and depth information may be assessed for each portion of an observed scene.

NUI system 910 processes low-level input (e.g., signals) from sensory components to provide actionable, high-level input to video-game system 900. For example, NUI system 910 may perform sound- or voice-recognition on audio signals from listening system 930. Such recognition may generate corresponding text-based or other high-level commands, which are received in the video-game system 900.

NUI system 910 includes a speech-recognition engine 912 and a gesture-recognition engine 914. Speech-recognition engine 912 is configured to: process audio data from listening system 930, recognize certain words or phrases in user speech, and generate corresponding actionable input to operating system 902 and/or video-game system applications 904.

Gesture-recognition engine 914 is configured to: process depth data from vision system 920, identify one or more human subjects in the depth data, compute various features of the subjects identified, and gather from the features gestural information used as NUI to operating system 902 or video-game system applications 904. Gesture-recognition application-programming interface (API) 903 is included in OS 902. Gesture-recognition API 903 offers callable code to provide actionable input for a plurality of processes running on the video-game system 900 based on a subject input gesture. Such processes may include application processes, operating system processes, and service processes, for example. In one embodiment, gesture-recognition API 903 may be distributed in a software-development kit (SDK) provided to application developers by the operating system maker.

Video-game system 900 includes a communication system 905 configured to communicatively couple NUI system 910 or video-game system 900 with one or more other computing devices over a network (e.g., network 120 and/or other type of network). Video-game system 900 also includes output devices including a display 916 and speakers 918.

In various implementations, components of video-game system 900 may be configured to perform various operations described in connection with client device 110, client application(s) 116, intelligent personal assistant 118, and/or other computing devices and/or applications. In one example embodiment, computer-readable instructions for performing such operations may be stored in a computer-readable storage medium, such as memory 908 for instance, and may be executed by processor(s) 906.

Exemplary Computing Environment

Figure 10:
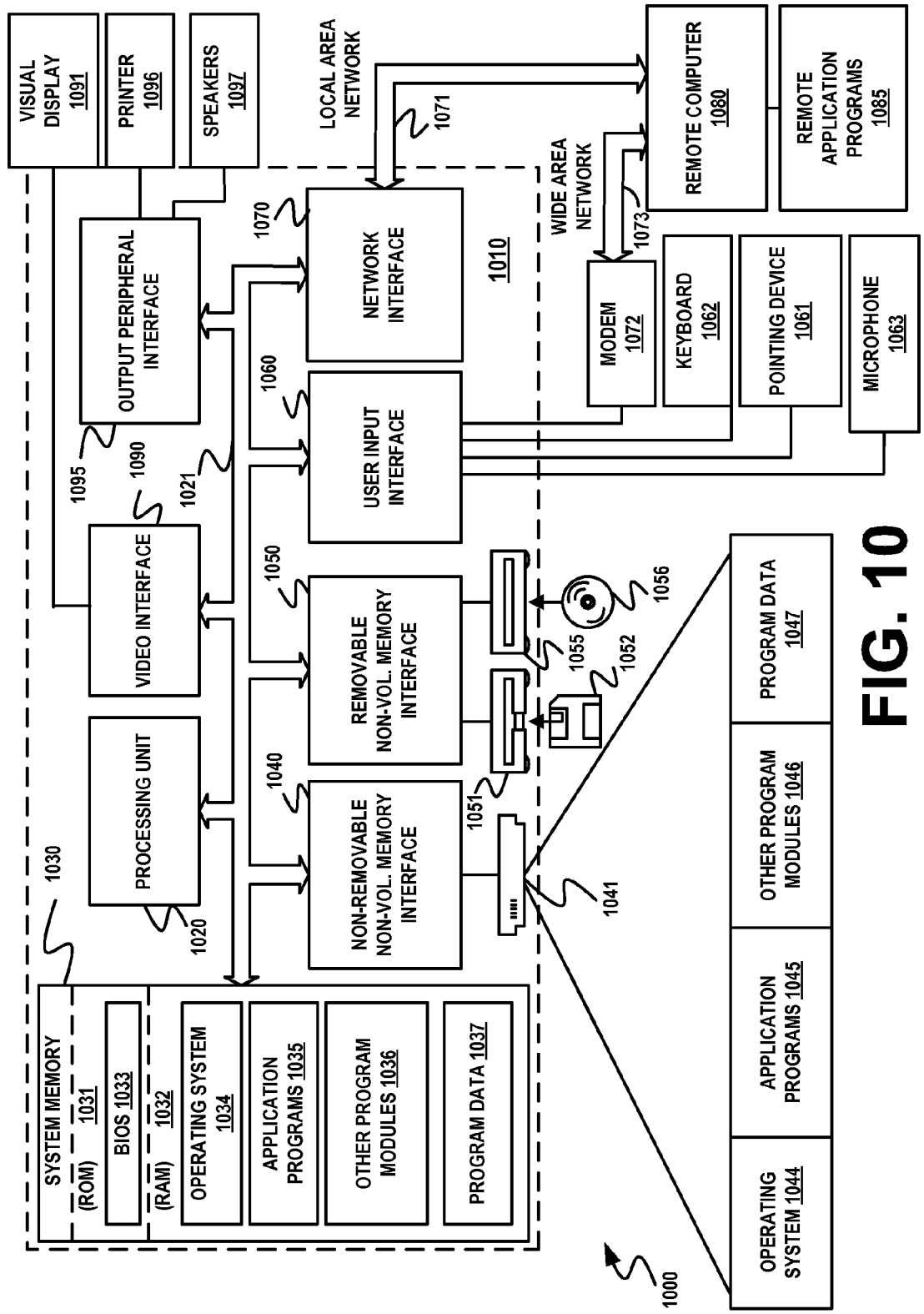
FIG. 10 illustrates an embodiment of an exemplary computing environment that may implement aspects of the described subject matter.

FIG. 10 illustrates a computing environment 1000 as an embodiment of an exemplary computing environment that may implement aspects of the described subject matter. As shown, computing environment 1000 includes a general-purpose computing device in the form of a computer 1010. In various implementations, computer 1010 may be an example of client device 110 and/or computer system 130.

Computer 1010 may include various components that include, but are not limited to: a processing unit 1020 (e.g., one or processors or type of processing unit), a system memory 1030, and a system bus 1021 that couples various system components including the system memory 1030 to processing unit 1020.

System bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

System memory 1030 includes computer storage media in the form of volatile and/or nonvolatile memory such as ROM 1031 and RAM 1032. A basic input/output system (BIOS) 1033, containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, an operating system 1034, application programs 1035, other program modules 1036, and program data 1037 are shown.

Computer 1010 may also include other removable/non-removable and/or volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 1041 is typically connected to system bus 1021 through a non-removable memory interface such as interface 1040, and magnetic disk drive 1051 and optical disk drive 1055 are typically connected to system bus 1021 by a removable memory interface, such as interface 1050.

Alternatively, or in addition, the functionality described herein can be performed, at least in part, by one or more hardware logic components. For example, and without limitation, illustrative types of hardware logic components that can be used include FPGAs, PASIC/ASICs, PSSP/ASSPs, a SoC, and CPLDs, for example.

The drives and their associated computer storage media discussed above and illustrated in FIG. 10, provide storage of computer readable instructions, data structures, program modules and other data for the computer 1010. For example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB).

A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

Computer 1010 is operated in a networked environment using logical connections to one or more remote computers, such as a remote computer 1080. Remote computer 1080 may be a personal computer, a hand-held device, a server, a router, a network PC, a peer device or other common network node, and typically includes many or all of the elements described above relative to the computer 1010. The logical connections depicted include a local area network (LAN) 1071 and a wide area network (WAN) 1073, but may also include other networks. Such networking environments are commonplace in offices, enterprise-wide computer networks, intranets and the Internet.

When used in a LAN networking environment, computer 1010 is connected to LAN 1071 through a network interface or adapter 1070. When used in a WAN networking environment, computer 810 typically includes a modem 1072 or other means for establishing communications over the WAN 873, such as the Internet. Modem 1072, which may be internal or external, may be connected to system bus 1021 via user input interface 1060, or other appropriate mechanism. In a networked environment, program modules depicted relative to computer 1010, or portions thereof, may be stored in a remote memory storage device. By way of example, and not limitation, remote application programs 1085 as shown as residing on remote computer 1080. It will be appreciated that the network connections shown are exemplary and other means of establishing a communications link between the computers may be used.

The detailed description provided above in connection with the appended drawings is intended as a description of examples and is not intended to represent the only forms in which the present examples may be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein may represent one or more of any number of processing strategies. As such, various operations illustrated and/or described may be performed in the sequence illustrated and/or described, in other sequences, in parallel, or omitted. Likewise, the order of the above-described processes may be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

The invention claimed is:

1. A computer-implemented method, comprising:
    converting verbal user input into text at a computing device that includes a plurality of applications stored in a memory device;
    analyzing, by the computing device, the text to determine a type of response that is requested by the verbal user input;
    identifying, by the computing device, an entity representation that includes a phrase contained in the text;
    determining, by the computing device, a set of entity types utilized by a structured knowledge source to provide the type of response;
    determining, by the computing device, one or more requirements of the structured knowledge source;
    tagging, by the computing device, the entity representation that includes the phrase with an entity type from the set of entity types;
    detecting, by the computing device, whether the entity representation that includes the phrase is a surface form of an entity and requires normalization to comply with the one or more requirements of the structured knowledge source;
    when it is determined that the surface form of the entity requires normalization, mapping, by the computing device, the surface form of the entity to a normalized value that complies with the one or more requirements of the structured knowledge source; and
    constructing, by the computing device, a request, wherein the request includes the normalized value instead of the entity representation.

2. The computer-implemented method of claim 1, wherein analyzing the text to determine the type of response that is requested by the verbal user input includes one or more of:
    detecting a domain of the verbal user input, and
    detecting an intent of the verbal user input.

3. The computer-implemented method of claim 1, wherein the set of entity types corresponds to a set of domain-dependent entity attributes.

4. The computer-implemented method of claim 1, further comprising:
    tagging one or more words contained in the phrase with a different entity type from the set of entity types.

5. The computer-implemented method of claim 1, wherein:
    mapping the surface form to the normalized value is performed deterministically using a set of normalization rules to normalize one of a temporal expression, a geographic expression, or a numerical expression to a canonical format.

6. The computer-implemented method of claim 1, wherein mapping the surface form to the normalized value is performed using a lookup table to normalize a variant of the entity to a canonical name.

7. The computer-implemented method of claim 1, wherein mapping the surface form to the normalized value is performed using one or more machined learned methods to map a natural language expression to a normalized condition.

8. The computer-implemented method of claim 1, wherein mapping the surface form to the normalized value is performed using an entity normalization index that associates entities with alternate surface forms derived from web corpora.

9. The computer-implemented method of claim 8, further comprising:
    extracting a set of entities from an entity knowledge source;
    extracting related links that are relevant to the set of entities from a knowledge graph;
    data mining one or more web search logs using the related links to discover related queries; and
    building the entity normalization index by associating the related queries with the set of entities as alternate surface forms of the entities.

10. The computer-implemented method of claim 1, further comprising:
    receiving, by the computing device, a response to the request that includes information from the structured knowledge source.

11. The computer-implemented method of claim 1, wherein the normalized value is used to construct a request that causes a task-based application to perform a particular task.

12. A computer-readable storage medium storing computer-readable instructions that, when executed by a processor of a computing device, causes the computing device to perform a method, comprising:
    converting verbal user input into text;
    analyzing the text to determine a type of response that is requested by the verbal user input;

identifying an entity representation that includes a phrase contained in the text;

determining a set of entity types utilized by a structured knowledge source to provide the type of response;

tagging the entity representation that includes the phrase with an entity type from the set of entity types;

detecting whether the entity representation that includes the phrase is a surface form of an entity and requires normalization to comply with one or more determined requirements of the structured knowledge source;

when it is determined that the surface form of the entity requires normalization, mapping the surface form of the entity to a normalized value that complies with the one or more determined requirements of the structured knowledge source; and constructing a request, wherein the request includes the normalized value instead of the entity representation.

13. The computer-readable storage medium of claim 12, wherein mapping the surface form of the entity to the normalized value comprises using a set of normalization rules, a lookup table, a machine learned method, and an index that associates entities with alternate surface forms derived from web corpora.

14. The computer-readable storage medium of claim 12, wherein the surface form is one or more of: a temporal expression, a geographic expression, a numerical expression, or a natural language expression.

15. The computer-readable storage medium of claim 12, wherein the request is configured for causing an application to perform a particular task that involves querying a remote resource for information related to the verbal user input.

16. The computer-readable storage medium of claim 12, wherein the set of entity types corresponds to a set of domain-dependent entity attributes.

17. A computing device, comprising:

a processor coupled to memory storing a plurality of applications and computer-readable instructions configured to:

convert verbal user input into text;

analyze the text to determine a type of response that is requested by the verbal user input;

identify an entity representation that includes a phrase contained in the text;

determine a set of entity types utilized by a structured knowledge source to provide the type of response;

tag the entity representation that includes the phrase with an entity type from the set of entity types;

detect whether the entity representation that includes the phrase is a surface form of an entity and requires normalization to comply with one or more determined requirements of the structured knowledge source;

when it is determined that the surface form of the entity requires normalization, map the surface form of the entity to a normalized value that complies with the one or more requirements of the structured knowledge source; and construct a request for the structured knowledge source, wherein the request includes the normalized value instead of the entity representation.

18. The computing device of claim 17, wherein the computer-executable instructions stored in the memory implement a conversational intelligent personal assistant that communicates with an application.

19. The computing device of claim 17, wherein the surface form is one or more of: a temporal expression, a geographic expression, a numerical expression, or a natural language expression.

20. The computing device of claim 17, wherein the application response is one or more of: answering a question, playing a media item, or scheduling an event.

* * * * *